US008549331B2

(12) United States Patent
Karam et al.

(10) Patent No.: US 8,549,331 B2
(45) Date of Patent: Oct. 1, 2013

(54) REDUNDANT POWER AND DATA IN A WIRED DATA TELECOMMUNICATIONS NETWORK

(75) Inventors: Roger A. Karam, Mountain View, CA (US); Luca Cafiero, Palo Alto, CA (US)

(73) Assignee: Cisco Technology, San Jose, CA (US)

( * ) Notice: Subject to any disclaimer, the term of this patent is extended or adjusted under 35 U.S.C. 154(b) by 508 days.

(21) Appl. No.: 12/875,489

(22) Filed: Sep. 3, 2010

(65) Prior Publication Data

US 2011/0004779 A1  Jan. 6, 2011

Related U.S. Application Data

(60) Division of application No. 11/022,266, filed on Dec. 23, 2004, now Pat. No. 7,793,137, which is a continuation-in-part of application No. 10/961,865, filed on Oct. 7, 2004, now Pat. No. 7,823,026.

(51) Int. Cl.
*G06F 1/26* (2006.01)

(52) U.S. Cl.
USPC .......................................... 713/300; 713/340

(58) Field of Classification Search
None
See application file for complete search history.

(56) References Cited

U.S. PATENT DOCUMENTS

| | | |
|---|---|---|
| 4,739,205 A | 4/1988 | Fuhrman |
| 4,835,737 A | 5/1989 | Herrig et al. |
| 5,122,691 A | 6/1992 | Balakrishnan |
| 5,148,144 A | 9/1992 | Sutterlin et al. |
| 5,237,511 A | 8/1993 | Caird et al. |
| 5,268,592 A | 12/1993 | Bellamy et al. |
| 5,289,359 A | 2/1994 | Ziermann |
| 5,331,631 A | 7/1994 | Teraslinna |
| 5,386,567 A | 1/1995 | Lien et al. |
| 5,406,260 A | 4/1995 | Cummings et al. |
| 5,461,671 A | 10/1995 | Sakuragi et al. |
| 5,483,574 A | 1/1996 | Yuyama |
| 5,491,804 A | 2/1996 | Heath et al. |

(Continued)

FOREIGN PATENT DOCUMENTS

WO  96/23377  8/1996

OTHER PUBLICATIONS

"IEEE Standard 802.3afTM", IEEE Standard for Information Technology—Telecommunications and Information Exchange Between Systems—Local and Metropolitan Area Networks—Specific Requirement, IEEE The Institute of Electrical and Electronics Engineering, Inc., Jun. 18, 2003.

(Continued)

*Primary Examiner* — Dennis M Butler
(74) *Attorney, Agent, or Firm* — BainwoodHuang

(57) ABSTRACT

Redundancy of data and/or inline power in a wired data telecommunications network from a pair of network devices via a selection device is provided by communicating redundant signals with each of the pair of network devices and coupling ports of the first network device and corresponding ports of the second network device to paired inputs of the selection device. The selection device operates: 1) under the control of the pair of network devices, one acting as master and one as slave, the master selecting (for each port or for all ports) one of the two paired inputs and causing the selection device to communicate data and/or inline power via a third port of the selection device to a third network device receiving data connectivity and/or inline power from the selection device; or 2) to route two redundant signals to a third network device which then selects one for use.

20 Claims, 21 Drawing Sheets

(56) References Cited

U.S. PATENT DOCUMENTS

| | | |
|---|---|---|
| 5,531,612 A | 7/1996 | Goodall et al. |
| 5,608,792 A | 3/1997 | Laidler |
| 5,613,130 A | 3/1997 | Teng et al. |
| 5,639,267 A | 6/1997 | Loudermilk |
| 5,715,293 A | 2/1998 | Mahoney |
| 5,726,506 A | 3/1998 | Wood |
| 5,742,513 A | 4/1998 | Bouhenguel et al. |
| 5,758,102 A | 5/1998 | Carey et al. |
| 5,775,946 A | 7/1998 | Briones |
| 5,790,391 A | 8/1998 | Stich et al. |
| 5,790,873 A | 8/1998 | Popper et al. |
| 5,793,987 A | 8/1998 | Quackenbush et al. |
| 5,796,185 A | 8/1998 | Takata et al. |
| 5,808,660 A | 9/1998 | Sekine et al. |
| 5,809,256 A | 9/1998 | Najemy |
| 5,834,925 A | 11/1998 | Chesavage |
| 5,884,086 A | 3/1999 | Amoni et al. |
| 5,884,233 A | 3/1999 | Brown |
| 5,991,885 A | 11/1999 | Chang et al. |
| 5,994,998 A | 11/1999 | Fisher et al. |
| 6,033,266 A | 3/2000 | Long |
| 6,036,547 A | 3/2000 | Belopolsky et al. |
| 6,059,581 A | 5/2000 | Wu |
| 6,068,520 A | 5/2000 | Winings et al. |
| 6,099,349 A | 8/2000 | Boutros |
| 6,115,468 A | 9/2000 | DeNicolo |
| 6,134,666 A | 10/2000 | DeNicolo |
| 6,162,089 A | 12/2000 | Costello et al. |
| 6,218,930 B1 | 4/2001 | Katzenberg et al. |
| 6,233,128 B1 | 5/2001 | Spencer et al. |
| 6,295,356 B1 | 9/2001 | DeNicolo |
| 6,310,781 B1 | 10/2001 | Karam |
| 6,396,392 B1 | 5/2002 | Abraham |
| 6,448,899 B1 | 9/2002 | Thompson |
| 6,496,105 B2 | 12/2002 | Fisher et al. |
| 6,541,878 B1 * | 4/2003 | Diab .................. 307/17 |
| 6,701,443 B1 | 3/2004 | Bell |
| 6,748,557 B1 | 6/2004 | Beardsley et al. |
| 6,762,675 B1 | 7/2004 | Cafiero et al. |
| 6,764,343 B2 | 7/2004 | Ferentz |
| 6,804,351 B1 | 10/2004 | Karam |
| 6,925,578 B2 | 8/2005 | Lam et al. |
| 6,938,179 B2 | 8/2005 | Iyer et al. |
| 6,958,699 B1 | 10/2005 | Karam |
| 6,986,071 B2 | 1/2006 | Darshan et al. |
| 6,996,134 B1 | 2/2006 | Renucci et al. |
| 6,996,458 B2 | 2/2006 | Pincu et al. |
| 7,058,847 B1 | 6/2006 | Guzman et al. |
| 7,089,126 B2 | 8/2006 | Muir |
| 7,107,358 B2 | 9/2006 | Vasko et al. |
| 7,145,439 B2 | 12/2006 | Darshan et al. |
| 7,154,381 B2 | 12/2006 | Lang et al. |
| 7,159,129 B2 | 1/2007 | Pincu et al. |
| 7,162,377 B2 | 1/2007 | Amrod et al. |
| 7,194,639 B2 | 3/2007 | Atkinson et al. |
| 7,221,261 B1 | 5/2007 | Klingensmith et al. |
| 7,272,746 B2 | 9/2007 | Deerman et al. |
| 7,299,368 B2 | 11/2007 | Peker et al. |
| 7,308,612 B1 | 12/2007 | Bishara |
| 7,353,407 B2 * | 4/2008 | Diab et al. .................. 713/300 |
| 7,363,525 B2 * | 4/2008 | Biederman et al. .......... 713/340 |
| 7,455,527 B2 | 11/2008 | Nordin et al. |
| 7,457,252 B2 * | 11/2008 | Karam et al. ................. 370/252 |
| 7,504,748 B2 | 3/2009 | Chang et al. |
| 7,515,526 B2 | 4/2009 | Elkayam et al. |
| 7,587,001 B2 | 9/2009 | Hazani et al. |
| 7,603,570 B2 * | 10/2009 | Schindler et al. ............ 713/300 |
| 7,620,846 B2 * | 11/2009 | Biederman et al. ............ 714/14 |
| 7,675,897 B2 | 3/2010 | Corcoran |
| 7,724,650 B2 | 5/2010 | Karam |
| 7,793,137 B2 * | 9/2010 | Karam et al. ................. 714/4.12 |
| 7,813,451 B2 | 10/2010 | Binder et al. |
| 7,823,026 B2 * | 10/2010 | Karam et al. .................... 714/43 |
| 7,849,351 B2 * | 12/2010 | Karam et al. ................. 714/4.1 |
| 7,856,007 B2 | 12/2010 | Corcoran |
| 7,903,809 B2 * | 3/2011 | Karam .......................... 379/413 |
| 8,074,084 B2 * | 12/2011 | Karam et al. ................. 713/300 |
| 8,184,681 B2 | 5/2012 | Binder et al. |
| 8,300,666 B2 * | 10/2012 | Karam et al. ................. 370/496 |
| 2004/0049321 A1 | 3/2004 | Lehr et al. |
| 2004/0073597 A1 | 4/2004 | Caveney et al. |
| 2004/0139371 A1 | 7/2004 | Wilson et al. |
| 2004/0146061 A1 | 7/2004 | Bisceglia et al. |
| 2004/0260794 A1 | 12/2004 | Ferentz et al. |
| 2005/0073783 A1 | 4/2005 | Luo et al. |
| 2005/0080516 A1 | 4/2005 | Pincu et al. |
| 2005/0085212 A1 | 4/2005 | Peker et al. |
| 2005/0132240 A1 | 6/2005 | Stineman, Jr. et al. |
| 2005/0165032 A1 | 7/2005 | Norman et al. |
| 2005/0197094 A1 | 9/2005 | Darshan et al. |
| 2005/0257262 A1 | 11/2005 | Matityahu et al. |
| 2006/0117212 A1 | 6/2006 | Meyer et al. |
| 2006/0239183 A1 | 10/2006 | Robitaille et al. |
| 2007/0053352 A1 | 3/2007 | Corcoran |
| 2007/0091800 A1 | 4/2007 | Corcoran |
| 2007/0173202 A1 | 7/2007 | Binder et al. |
| 2008/0100141 A1 | 5/2008 | Lee et al. |
| 2008/0146146 A1 | 6/2008 | Binder et al. |
| 2011/0206088 A1 | 8/2011 | Binder et al. |

OTHER PUBLICATIONS

"3Com® NJ100 Network Jack Power", printed from http://www.poweroverethernet.com/manual/content/view/full/776/,3Com, Tuesday, Mar. 18, 2003.

3Com User Guide-3Com IntelliJack, Model NJ220, Version 1.0, 3Com, Nov. 2003.

"3Com User Guide," 3Com Network Jack, Model NJ200, Version 1.0, 3Com, Sep. 2002.

G. Mendelson, XP-002372480 Power Dsine, White Paper, All You Need to Know About Power Over Ethernet (PoE) and the IEEE 802.3af Standard, Jun. 2004.

Lynn, K., "Universal Serial Bus (USB) Power Management," Wescon Conference, IEEE, Sep. 1998, pp. 194-201.

\* cited by examiner

REDUNDANT POWER AND DATA IN A WIRED DATA TELECOMMUNICATIONS NETWORK

This Patent Application is a divisional of U.S. patent application Ser. No. 11/022,266 filed on Dec. 23, 2004, entitled, "REDUNDANT POWER AND DATA IN A WIRED DATA TELECOMMUNICATIONS NETWORK", the contents and teachings of which are hereby incorporated by reference in their entirety.

STATEMENT OF RELATED CASES

U.S. patent application Ser. No. 11/022,266 is a continuation-in-part of commonly owned U.S. patent application Ser. No. 10/961,865 filed on Oct. 7, 2004 and entitled "Automatic System for Power and Data Redundancy in a Wired Data Telecommunications Network" in the names of inventors Roger A. Karam and Luca Cafiero. That application is hereby incorporated herein by reference as if set forth fully herein.

U.S. patent application Ser. No. 11/022,266 may be considered to be related to commonly owned U.S. patent application Ser. No. 11/000,734 filed on Nov. 30, 2004 and entitled "Power and Data Redundancy in a Single Wiring Closet" in the names of inventors Roger A. Karam and Luca Cafiero. That application is hereby incorporated herein by reference as if set forth fully herein.

U.S. patent application Ser. No. 11/022,266 may be considered to be related to commonly owned U.S. Pat. No. 7,363,525 entitled "Bidirectional Inline Power Port" in the names of inventors Daniel Biederman, Kenneth Coley and Frederick R. Schindler.

U.S. patent application Ser. No. 11/022,266 may also be considered to be related to commonly owned U.S. Pat. No. 7,620,846 entitled "Redundant Power and Data Over A Wired Data Telecommunications Network" in the names of inventors Daniel Biederman, Kenneth Coley and Frederick R. Schindler.

U.S. patent application Ser. No. 11/022,266 may also be considered to be related to commonly owned U.S. patent application Ser. No. 10/961,904 filed on Oct. 7, 2004 and entitled "Inline Power-Based Common Mode Communications in a Wired Data Telecommunications Network" in the names of inventors Roger A. Karam, Frederick R. Schindler and Wael William Diab.

U.S. patent application Ser. No. 11/022,266 may also be considered to be related to commonly owned U.S. patent application Ser. No. 10/982,383 filed on Nov. 5, 2004 and entitled "Power Management for Serial-Powered Device Connections" in the name of inventor Roger A. Karam.

U.S. patent application Ser. No. 11/022,266 may also be considered to be related to commonly owned U.S. patent application Ser. No. 10/981,203 filed on Nov. 3, 2004 and entitled "Powered Device Classification In A Wired Data Telecommunications Network" in the name of inventors Roger A. Karam and John F. Wakerly.

U.S. patent application Ser. No. 11/022,266 may also be considered to be related to commonly owned U.S. Pat. No. 7,457,252 entitled "Current Imbalance Compensation for Magnetics in a Wired Data Telecommunications Network" in the names of inventors Roger A. Karam and John F. Wakerly.

U.S. patent application Ser. No. 11/022,266 may also be considered to be related to commonly owned U.S. Pat. No. 7,603,570 entitled "Improved Power Delivery over Ethernet Cable" in the names of inventors Wael William Diab and Frederick R. Schindler.

U.S. patent application Ser. No. 11/022,266 may also be considered to be related to commonly owned U.S. Pat. No. 6,541,878 entitled "Integrated RJ-45 Magnetics with Phantom Power Provision" in the name of inventor Wael William Diab.

U.S. patent application Ser. No. 11/022,266 may also be considered to be related to commonly owned U.S. Pat. No. 7,353,407 entitled "Methods and Apparatus for Provisioning Phantom Power to Remote Devices" in the name of inventors Wael William Diab and Frederick R. Schindler.

FIELD OF THE INVENTION

The present invention relates generally to networking equipment which is powered by and/or powers other networking equipment over wired data telecommunications network connections.

BACKGROUND OF THE INVENTION

Inline power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published 18 Jun. 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 820.3af standard is a globally applicable standard for combining the transmission of Ethernet packets with the transmission of DC-based power over the same set of wires in a single Ethernet cable. It is contemplated that Inline power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard. Two conductor wiring such as shielded or unshielded twisted pair wiring (or coaxial cable or other conventional network cabling) may be used so each transmitter and receiver has a pair of conductors associated with it.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the Midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the previously described variants.

Turning now to FIGS. 1D and 1E, electrical schematic diagrams illustrate variants of the IEEE 802.3af standard in which 1000 Base T communication is enabled over a four pair Ethernet cable. Inline power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether inline power is delivered over Pair 1-2, Pair 3-4 or Pair 1-2+Pair 3-4. In the circuit shown in FIG. 1E a PD associated with Pair 1-2 is powered by inline power over Pair 1-2 and a PD associated with Pair 3-4 is similarly powered. The approach used will depend upon the PD to be powered. In accordance with both of these versions, bidirectional full duplex communication may be carried out over each data pair, if desired.

Inline power is also available through techniques that are non-IEEE 802.3 standard compliant as is well known to those of ordinary skill in the art.

In order to provide regular inline power to a PD from a PSE it is a general requirement that two processes first be accomplished. First, a "discovery" process must be accomplished to verify that the candidate PD is, in fact, adapted to receive inline power. Second, a "classification" process must be accomplished to determine an amount of inline power to allocate to the PD, the PSE having a finite amount of inline power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some inline power (not "regular" inline power, i.e., reduced voltage and limited current) as the discovery signal to measure resistance across the two pairs of conductors to determine if the 25,000 ohm identity network is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular inline power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
|---|---|---|
| 0 | 0-5 | 15.4 |
| 1 | 8-13 | 4.0 |
| 2 | 16-21 | 7.0 |
| 3 | 25-31 | 15.4 |
| 4 | 35-45 | 15.4 |

The discovery process is therefore used in order to avoid providing inline power (at full voltage of −48 VDC) to so-called "legacy" devices which are not particularly adapted to receive or utilize inline power.

The classification process is therefore used in order to manage inline power resources so that available power resources can be efficiently allocated and utilized.

In many cases where PDs are used, it may be desirable to provide some redundancy in terms of data and/or power delivery for cases in which equipment (hubs, switches, cable and the like) providing the power and/or data fails to continue to do so.

SUMMARY OF THE INVENTION

In one aspect of the present invention, redundancy of data and/or inline power in a wired data telecommunications network from a pair of redundant power sourcing equipment (PSE) network devices (such as hubs, switches, routers or the like) via a selection device is provided by communicating redundant signals with each of the pair of redundant network devices and coupling one or more ports of a first of the pair of network devices and a corresponding one or more ports of a second of the pair of network devices to paired inputs of the selection device. The selection device operates under the control of the pair of network devices, one acting as master and one as slave at any given moment, the master selecting (for each port or for all ports) one of the two paired inputs and causing the selection device to communicate data and/or inline power with a third port of the selection device. A third network device (which may be a powered device (PD) such as a Voice Over Internet Protocol (VOIP) telephone unit, another network device such as a hub, switch, or the like, a wireless access point, an IP (Internet Protocol) camera, an IP sensor, or any other suitable network device to which it would be desirable to provide redundant data communications and/or inline power) coupled to that output port receives data connectivity and/or inline power from the selection device. The redundant pair of network devices have the ability to communicate with one another and with the selection device. Upon detection of a condition, such as a failure condition relating to the master network device, the slave network device may direct the selection device to provide connectivity between the slave and the third network device. One of the network devices or the selection device may also respond to the detection of the condition by initiating a wired or wireless communication to a network control point and/or service personnel to advise of the condition.

In another aspect of the present invention, a selection device simply provides a signal path between each of the pair of redundant network devices and the third network device and redundant signals are normally supplied to the third network device. The third network device makes its own decision as to which signal path to use.

Other aspects of the inventions are described and claimed below, and a further understanding of the nature and advantages of the inventions may be realized by reference to the remaining portions of the specification and the attached drawings.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 12 is an electrical schematic diagram of the selection device of FIG. 11 but with an added local PD in the selection device to bias the diodes ON making the connection compatible with legacy Ethernet or possible with a switch where no PD is available to draw DC current for inline power to keep the diodes ON.

DETAILED DESCRIPTION

Figure 1A:
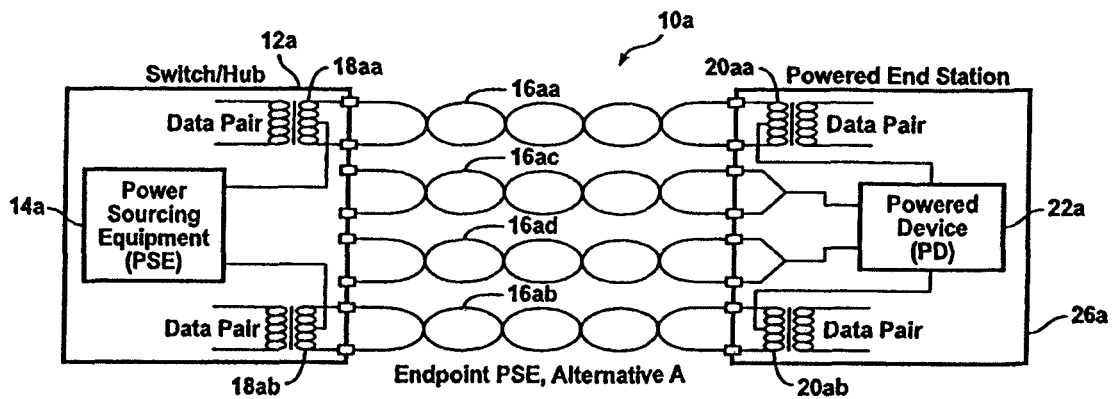
FIGS. 1A, 1B, 1C, 1D and 1E are electrical schematic diagrams of portions of data telecommunications networks in accordance with the prior art.
Figure 1B:
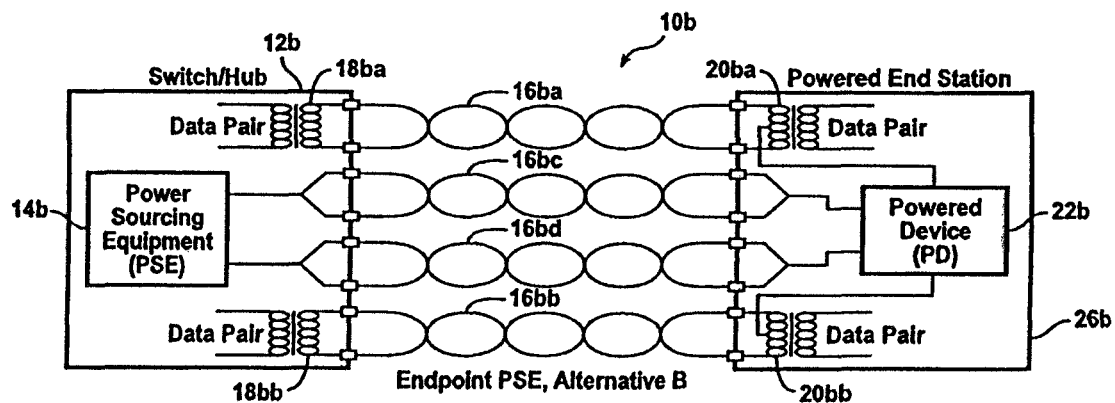
Figure 1C:
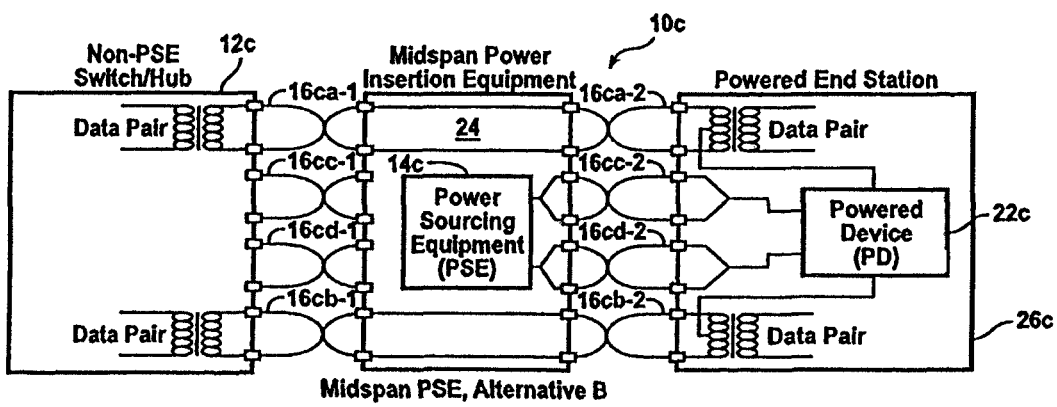
Figure 1D:
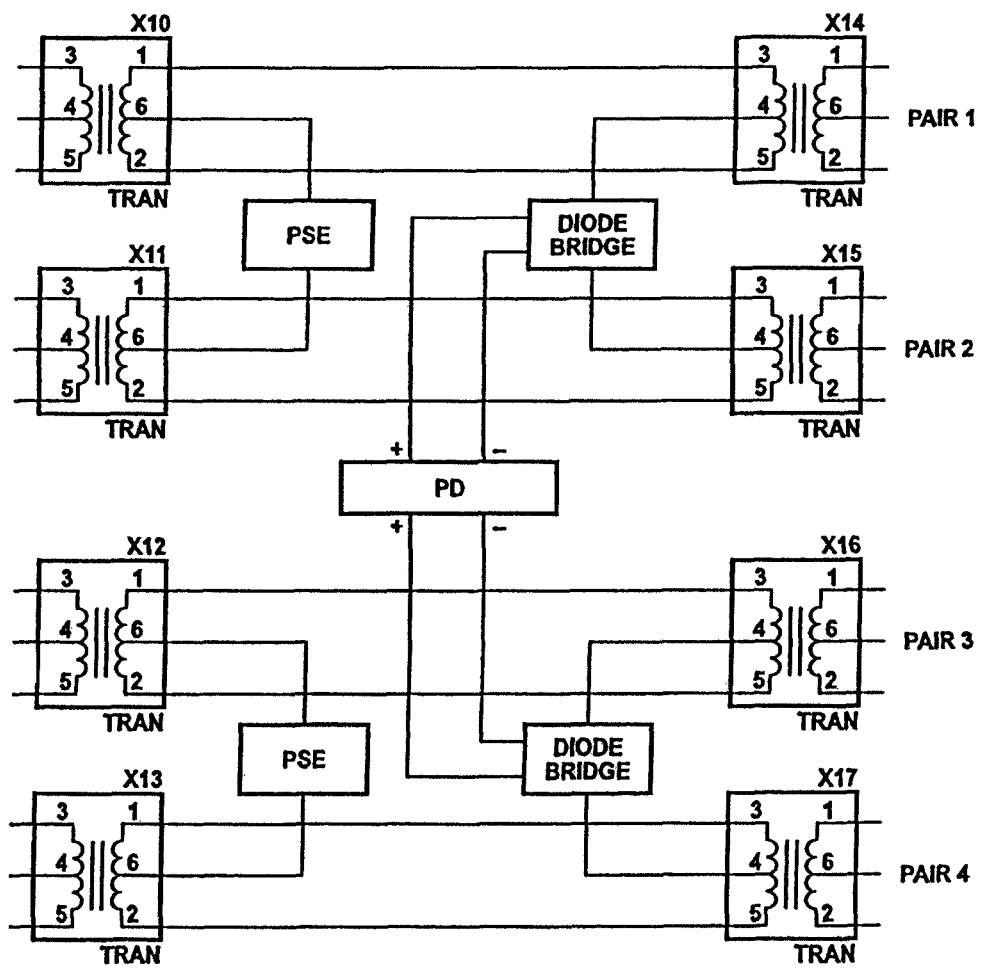
Figure 1E:
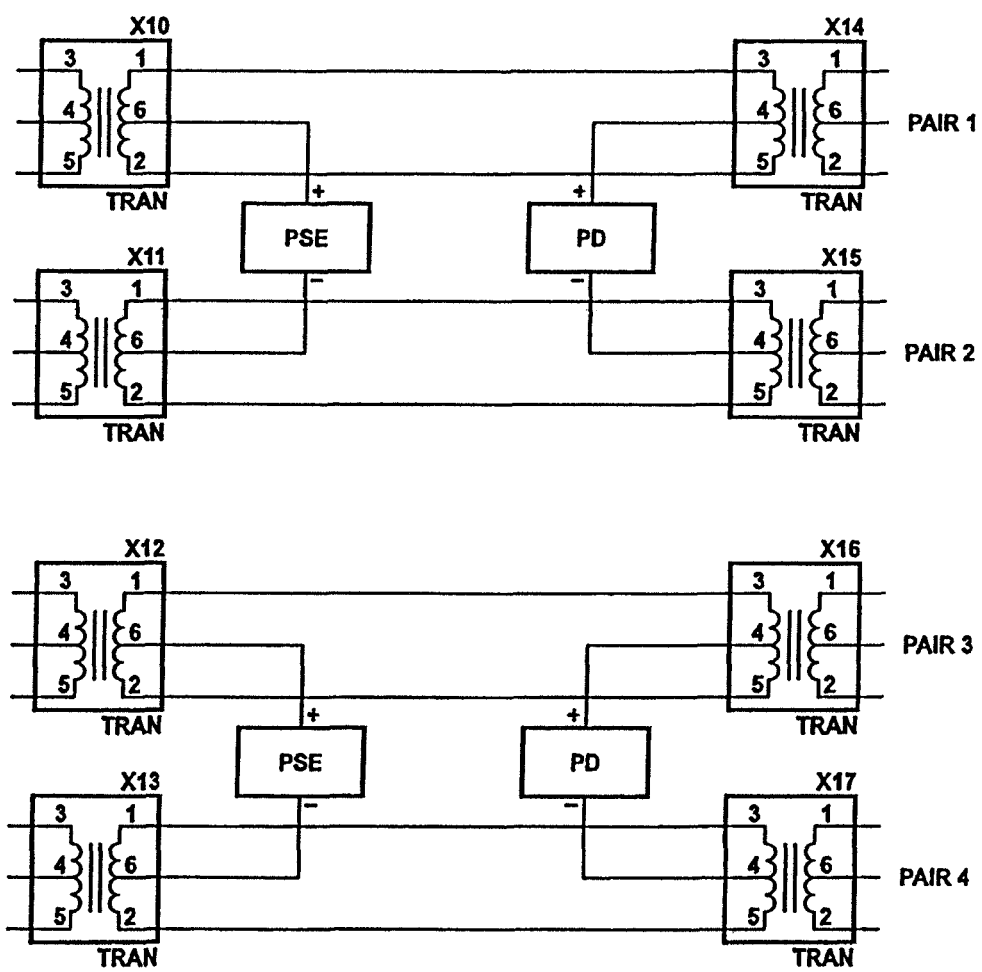

Embodiments of the present invention described in the following detailed description are directed at redundant power and data in a wired data telecommunications network. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Data communications networks have become an integral part of everyday life for many people. As important and even critical applications are carried out over such networks, the ability to provide very high reliability to such networks becomes more and more important. Some such applications now include voice over internet protocol (VOIP) telephone communications, email, computer connectivity and the like. In wired data telecommunications networks, such as well-known Ethernet networks, connectivity is provided by cables containing wire conductors. End user terminals (telephones, PDAs, laptop or desktop computers, and the like), when connected by wires (as opposed to wirelessly) are normally coupled to a switch or router by a single Ethernet cable, or via an Ethernet cable to a wall jack, which is, in turn, coupled to a switch or router via a single cable. The switches and routers are frequently connected among themselves by single Ethernet cables. If a switch, for example, were to fail or go "down", the connected devices would become inoperative, at least insofar as their network connectivity were concerned. If they were powered entirely by inline power, they would power down in the absence of the inline power. This invention is directed to providing some redundant capability in such situations.

In accordance with an embodiment of the present invention, redundancy of data and/or inline power in a wired data telecommunications network from two or more redundant telecommunications network devices (such as hubs, switches, routers or the like) configured as power sourcing equipment (PSE) devices via a selection device controlled by the redundant network devices is provided by sending a redundant signal to each of the redundant network devices (e.g., by routing essentially duplicate packets (except, e.g., for address information)) to each of them, and coupling a port of one redundant telecommunications device and a redundant port of the second redundant telecommunications device (and possibly others) to respective first and second (or more) interfaces of an input port of the selection device. The selection device of the present invention operates under the control of one or more of the redundant network devices and has no conventional PHYs in line with the signals being redundantly processed. One of the redundant network devices initially configures the selection device so that it selects one of the redundant signal paths with the redundant network devices and communicates data and/or inline power from the selected device with a third port of the selection device. A third network device, which may be a powered device (PD) coupled (similarly PHY-lessly) to that third port, receives data and/or inline power from the selection device. More than one redundant output could also be provided, if desired, and could operate either in parallel or on demand, i.e., if one goes down, the other could be put up). The redundant outputs would be coupled to redundant ports on the third device which would, in turn, operate off of one of the two ports—a first port and, in the event of a failure or command, the second port. Upon detection of a condition, such as a failure condition in one of the redundant network devices (or a command), the selection device may be instructed to select the other of the two (or more) ports by one or more of the redundant network devices. The selection device may operate to select all of the ports at the same time (as in switching from the ports of Switch 1 to the ports of Switch 2), or it may operate on less than all of the ports at the same time (leaving other ports unswitched). In response to the detection of the condition, the selection device and/or one or more of the redundant network devices may initiate a communication to a network control point and/or to service personnel in order to request service for the possibly failed device. This notification may be done either over the wired data telecommunications network or with an attached wireless networking device in communication with a node of the wired data telecommunications network, or another network, so as to be able to carry out the notification even in the event of a wiring failure. The wireless networking device may be backed up with a battery or large capacitor so that it continues to be powered for some time after such a failure.

In accordance with another embodiment of the present invention, a selection device simply provides a signal path from each of the pair of redundant network devices to the third network device and redundant signals are normally supplied to the third network device. The third network device makes its own decision as to which signal path to use. This is discussed in more detail below in connection with the discussion of the embodiments illustrated in FIGS. 7 and 8.

Figure 2:
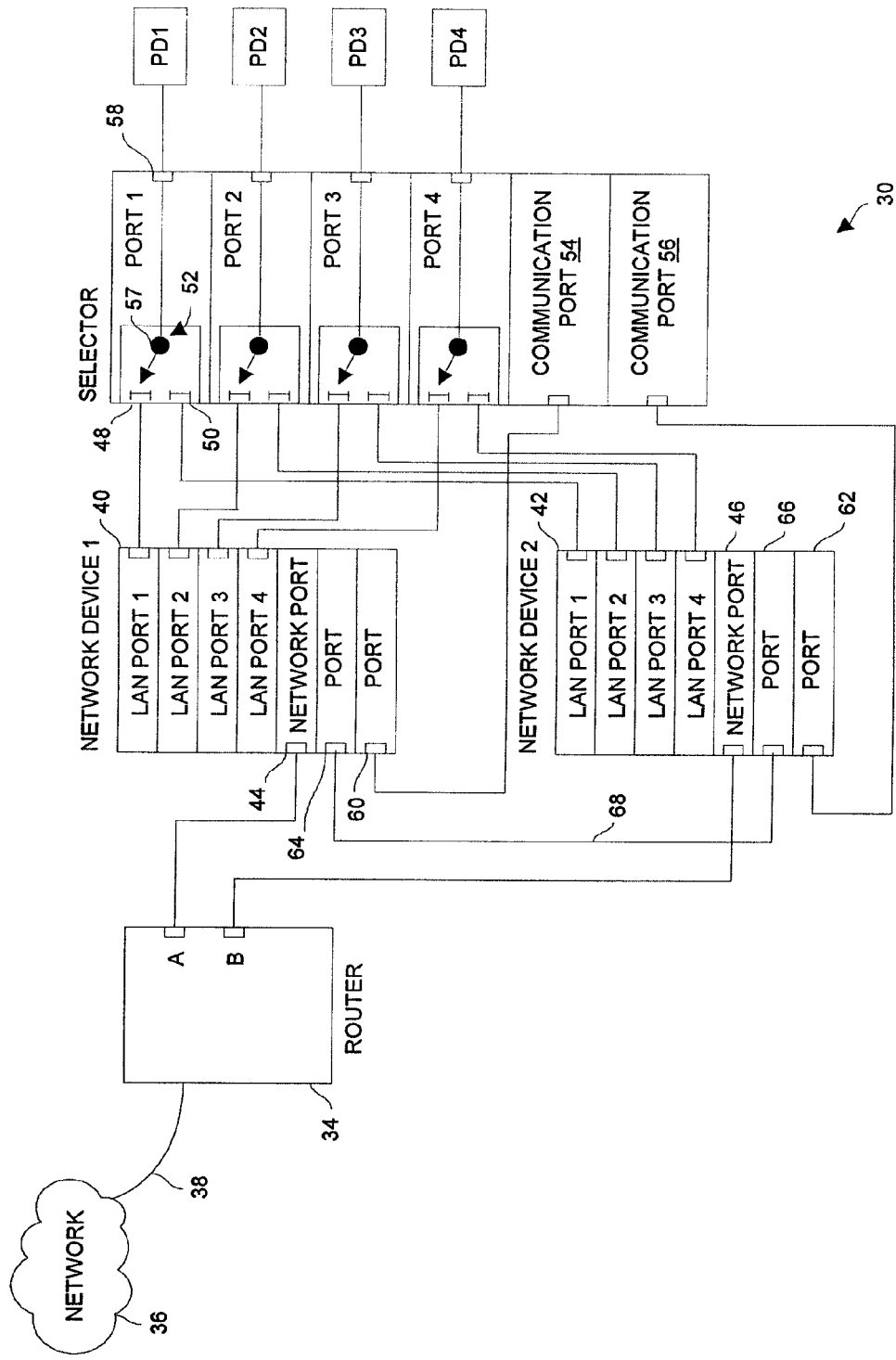
FIG. 2 is a system block diagram of a redundant network segment incorporating a selector in accordance with an embodiment of the present invention.

FIG. 2 is a system block diagram of a network segment 30 including a selector device 32 in accordance with an embodiment of the present invention. While one particular configuration is shown here, those of ordinary skill in the art will now realize that many variations on this configuration are also possible and within the scope of this invention. A router 34 couples network segment 30 to a larger network 36 such as a local area network (LAN), metropolitan area network (MAN) or wide area network (WAN) such as the Internet, a corporate Intranet or the like. The link 38 coupling router 34 to network 36 may be any suitable network link such as Ethernet, fiber, a satellite link, a terrestrial wireless link and the like. Router 34 may be any device capable of providing data redundancy to first network device 40 and second network device 42. The idea here is to couple port A of router 34 to the network port 44 of first network device 40 and port B of router 34 to the network port 46 of second network device 42. The packets of data sent to device 40 should be essentially the same as those going to device 42, except that the specific media access controller (MAC) address contained in the packet headers may be different in some cases (although this is not required). Each network device 40 and 42 operates, in accordance with an embodiment of the present invention, like a network switch with a number of ports. Port 1 of selector 32 has two interfaces. A first interface 48 couples port 1 to LAN port 1 of device 40. A second interface 50 couples port 1 to LAN port 1 of device 42. In this manner, at least one port of selector 32 is coupled to a port from device 40 and a port from device 42 and each of the device 40 and 42 ports is receiving essentially the same data packets. Note that the physical embodiment of network devices 40 and 42 may be such that they are separate line cards in a larger device, preferably running off of separate power supplies for redundancy, or they can be in different physical locations, or they can be built into the same box or rack as the selection device for ease of installation.

A switching circuit 52 associated with a redundant port of selector 32 (there may be other ports for other communications purposes—such as ports 54 and 56) is used to select among the available interfaces. In this example the switching circuit 52 has two states. If more than two interfaces for a port are provided, the switching circuit 52 will accordingly have more than two states. The common node 57 of the switching circuit 52 couples the selected interface to a port connection 58 with an optionally attached third network device PD1 (59)

which may (or may not) be a PD (if not a PD, it might be a PSE, a legacy (non-inline-powered device), or the like. Such a device may be, but is not limited to, a VOIP telephone, a network terminal device, a wireless access point, an IP camera, a sensor of virtually any kind). When it is not coupled to a PD, port 58 must behave like a "legacy Ethernet" port (i.e., no inline power activity) in accordance with an embodiment of the present invention.

Note that additional network connectivity is desirable (but not required) among the redundant network devices 40, 42 and between the redundant network devices 40, 42 and the selection device 32. Such connectivity is useful for providing status information and control signals where appropriate as well as back-up communications path for additional redundancy. Accordingly, extra ports such as communications ports 54 and 56 may be provided in the selection device 32 for connection to similar ports 60, 62 of the redundant network devices 40, 42, or, alternatively, or additionally, if unused pairs of the cables coupling the network device ports to the interfaces of the selection device 32 are available, they may be used for such communications. For example, in 10 Base T and 100 Base T Ethernet systems, only the Pair 3-6 pair of conductors and the Pair 1-2 pair of conductors are used to carry signals. The Pair 4-5 pair and the Pair 7-8 pair are normally unused. These could now easily be used to carry data between the redundant network devices 40, 42 and the selection device 32 at each port/interface. Wireless connections may alternatively be used or employed as a backup for this application. If desired, port 64 of first network device 40 and port 66 of second network device 42 may be provided and coupled together with link 68 as illustrated for switch-switch communications.

Thus, in accordance with the present invention redundant inline power and/or data in 10/100/1000 Base T Ethernet or higher speed networking systems (and similar systems) use switch-based control and management (i.e., control and management, error detection and recovery is primarily accomplished in the redundant network devices) with possible assistance from the third device. The selector device 32 can be mostly passive, but can have local active circuitry limited to assisting switch based management activities.

It is important to note that in 10/100 Base T Ethernet implementations, only Pair 1-2 and Pair 3-6 are used with Pair 4-5 and Pair 7-8 remaining unused. The numbers here refer to the conductor numbers used in the IEEE specifications relating to Ethernet. In 1000 Base T Ethernet and higher networking standards using 8 conductor (4 pair) cables, all conductors are generally used and thus must be accommodated. The implementations illustrated herein are generally useable for either 2-pair or 4-pair implementations unless specifically limited to 2-pair implementations because the other two pairs are being used for some other function.

Also note that while the devices described herein are intended to be operable with so-called legacy devices, it adds a lot of value if the third network device has some of the features built in as discussed in this disclosure to help with management, error detection, recovery and control of the link's data transfer and power availability to decrease the chances of failures or better make use of redundant features.

The selector device 32 operates as a Y in the sense that it has two legs coupled to redundant network devices and one leg coupled to a third device and it is in the position to select or be forced to select one of the pair of redundant network devices to couple to the third device. In accordance with this invention, the selection is accomplished by the use of inline signal diodes (which may optionally be protected by resetable inline fuses). Such diodes exist in series with the conductor of the cable (to the various network devices) and are either ON permitting Data transfer when DC current flows through them, or OFF. When OFF no effective loading or stub would be present at the Y joint connection since an OFF diode with low parasitic capacitance would present a high-impedance. Also the use of such diodes would prevent the second connector (to the second network device) from having a hot-plug condition (i.e., 48 VDC inline power present) should the cable be disconnected from it while the first device is supplying inline power. The use of such diodes permit the use of any cable length supported by the networking standard employed between the selector 32 and any attached network device.

Figure 3:
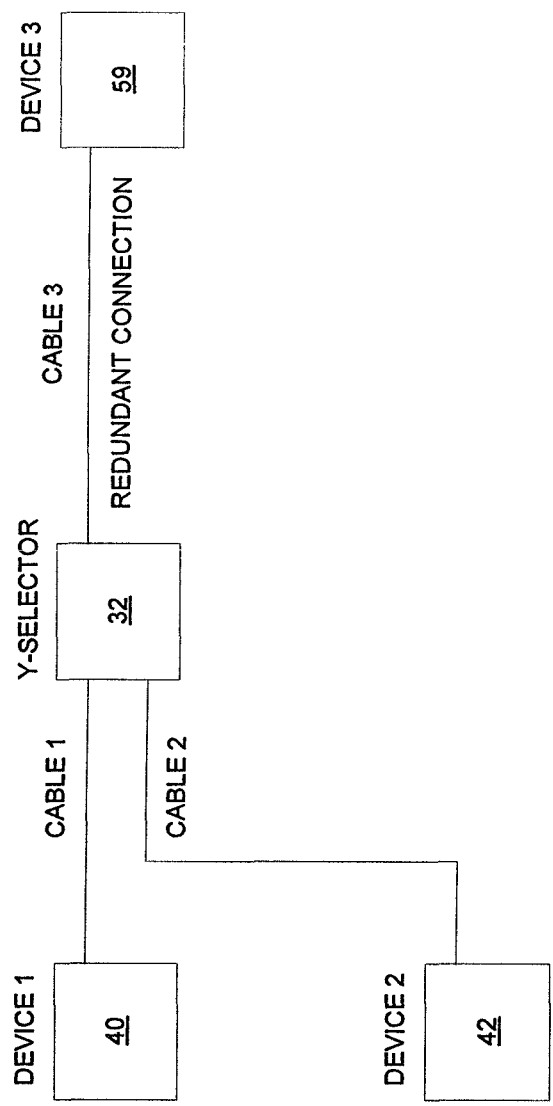
FIG. 3 is a block diagram illustrating a configuration where two redundant network devices are distinct from a selection device, which is, in turn, distinct from a third network device.
Figure 4:
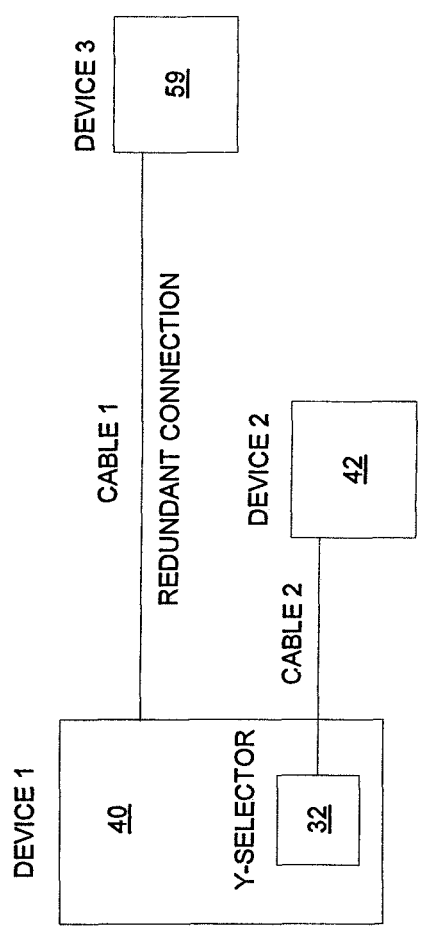
FIG. 4 is a block diagram illustrating a configuration where a selection device is built into a first network device and a second network device plugs into the selection device at the first network device.
Figure 5:
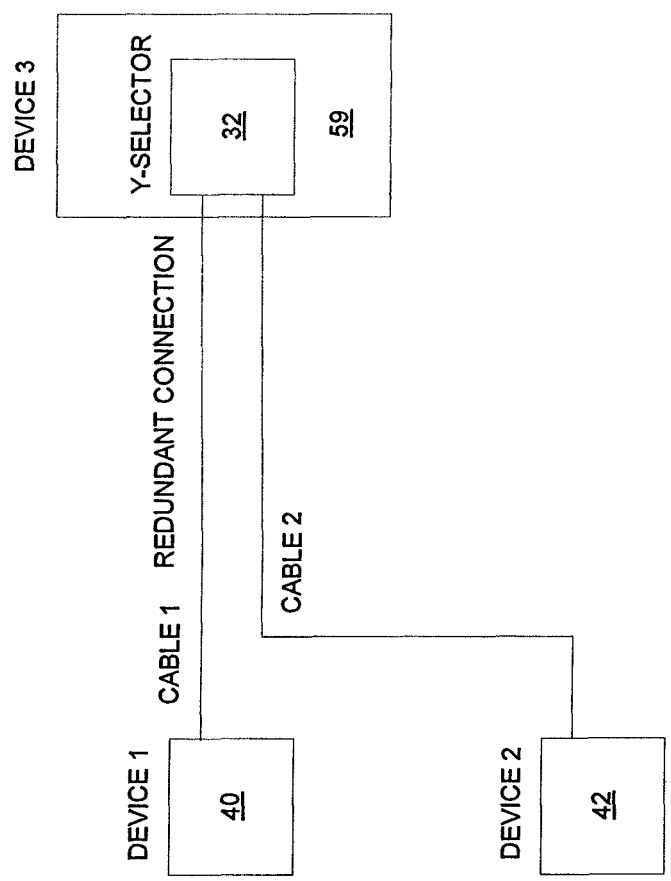
FIG. 5 is a block diagram illustrating a configuration where a selection device is built into a third network device and a first and a second network device plug into the selection device at the third network device.

The selection device 32 may have any number of input ports and any number of input interfaces per port. Each of the redundant network devices is associated with one of the input interfaces. It has one output port for each input port. The third device is associated with the output port. As discussed above the input ports and output ports are capable of bidirectional communication. The selection device described herein will have two interfaces per port and just a single input port and output port to avoid over-complicating the disclosure. Those of ordinary skill in the art will now readily realize that the teachings herein may easily be extrapolated to cover multi-port devices. There are a number of ways to configure the selection device and associated network devices. FIG. 3 is a block diagram illustrating a configuration where the two redundant network devices 40, 42 are distinct from the selection device 32, which is, in turn, distinct from the third network device 59. In this case the two redundant network devices 40, 42 and selection device 32 may be co-located in a single wiring closet or even a single equipment chassis, or they may be physically remote from one another. For example, the selection device 32 may be located proximate third device 59. FIG. 4 is a block diagram illustrating a configuration where selection device 32 is built into first network device 40 and second network device 42 plugs into selection device 32 at device 40. The redundant communications with third device 59 take place over Cable 1 between first network device 40 and third network device 59 as shown. FIG. 5 is a block diagram illustrating a configuration where selection device 32 is built into third network device 59 and first and second network devices 40, 42 plug into the selection device 32 at the third network device 59 as shown. The principles of the present invention apply regardless of the configuration used in a particular instance.

Figure 6:
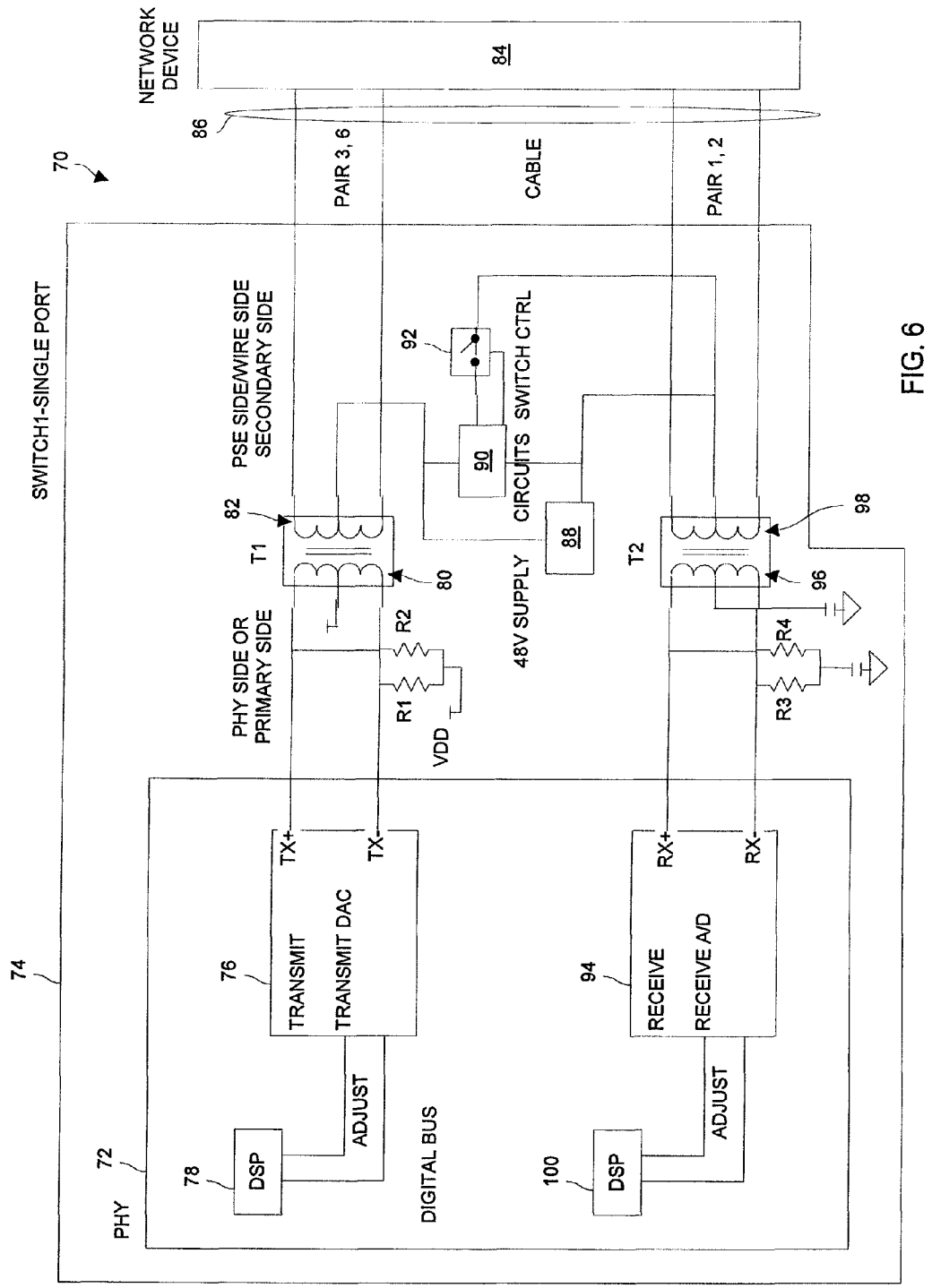
FIG. 6 is an electrical schematic diagram of a 10/100 Base T Ethernet wired data telecommunications network segment 70 as may be used in accordance with an embodiment of the present invention.

FIG. 6 is an electrical schematic diagram of a 10/100 Base T Ethernet wired data telecommunications network segment 70 as may be used in accordance with an embodiment of the present invention. A PHY 72 associated with a port 74 of a network device includes a transmitter 76 which may be implemented with a transmit DAC (digital to analog converter) and receive signals to be transmitted from a DSP 78 (digital signal processor) which may be coupled to receive the transmitted signal to monitor and adjust it. The transmitter generates a differential transmit signal (TX+ and TX−) which is applied to a center-tapped primary winding 80 of magnetic device (transformer) T1. The center tap of primary 80 is biased to Vdd (which may be +3.3 VDC in one embodiment of the present invention) and the TX+ and TX− lines are biased to Vdd as well through 50 ohm resistors terminating the line with a 100 ohm impedance. Coupled to center-tapped secondary winding 82 of magnetic device T1 are a pair of conductors designated PAIR 3-6 which are coupled to another network device 84 via an Ethernet (or similar) cable 86. The center tap of secondary winding 82 is coupled to a PSE power supply 88 and other circuitry 90, 92 for use in common mode inter-device signaling as described, for example, in commonly owned U.S. patent application Ser. No. 10/961,904 filed on Oct. 7, 2004 and entitled "Inline Power—Based Common Mode Communications in a Wired Data Telecommunications Network" in the names of inventors Roger A. Karam, Frederick R. Schindler and Wael William Diab. Receiver 94 receives differential analog signals on the RX+/RX-pair of conductors from a center-tapped primary 96 of magnetic device T2 (biased to ground and terminated with a 100 ohm impedance). Magnetic device T2's secondary center-tapped winding receives differential analog signals on Pair 1-2 from device 84 via cable 86. PSE 88 and communication circuitry 90, 92 is coupled as well to the center tap of secondary 98 as shown. Receiver 94 provides an output to a DSP 100.

Figure 7:
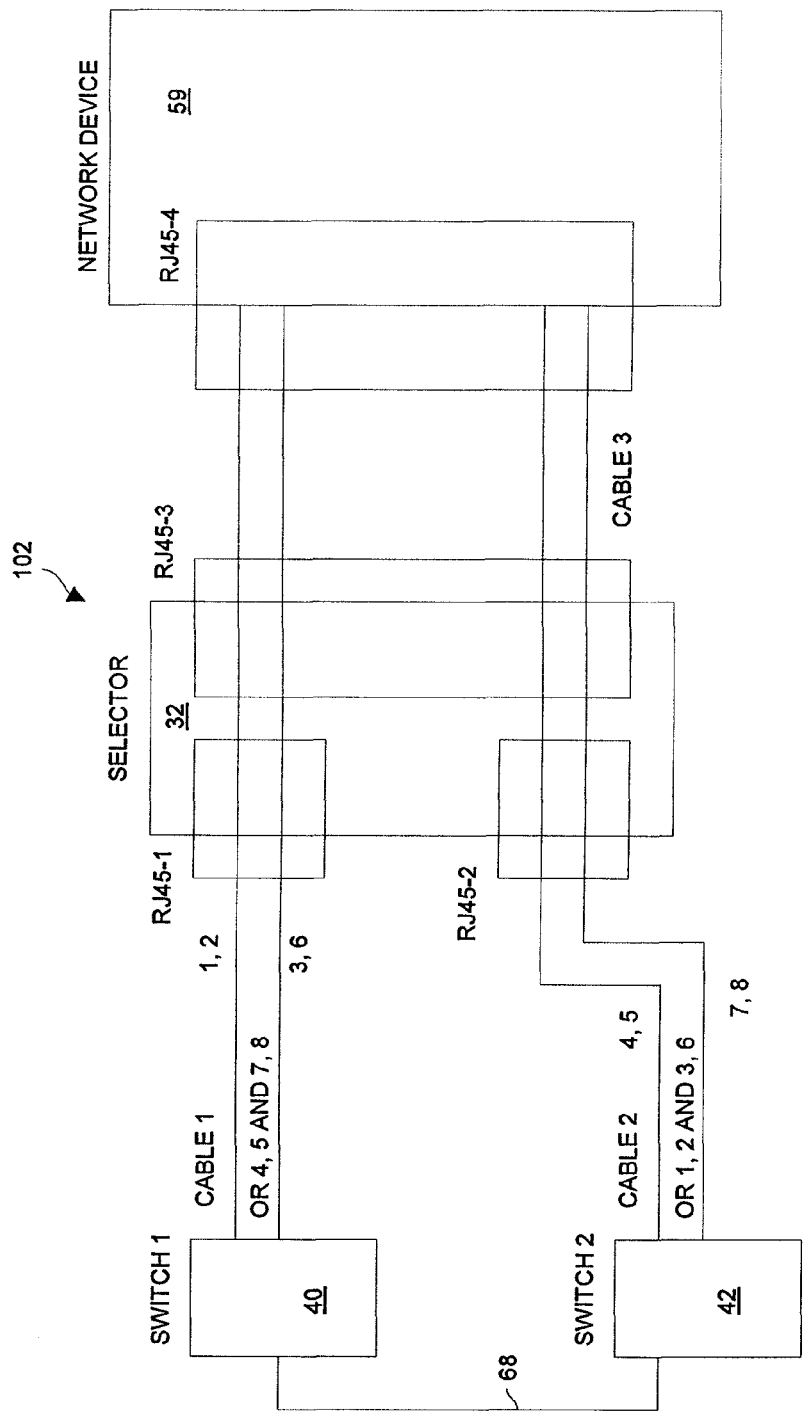
FIG. 7 is a system block diagram of a segment of a wired data telecommunications network including a first switch, a second switch, a selection device and a third network device in accordance with an embodiment of the present invention.

FIG. 7 is a system block diagram of a segment 102 of a wired data telecommunications network including a first switch 40, a second switch 42, a selection device 32 and a third network device 59. Note that from this point in the disclosure the first network device 40 will be treated as the initial master and the second network device 42 will be treated as the initial slave. Certain detected faults will cause the slave to become master. The connections between the redundant network devices 40, 42 and the selection device 32 are carried by cable 1 and cable 2, respectively, to connectors RJ-45-1 and RJ-45-2, and the selection device 32 configures its third connector, RJ-45-3 to provide redundant 10/100 Base T Ethernet communications and/or inline power from the two different devices to a third device 59 over cable 3 coupling selection device 32 to the third device 59. Note that any sets of pairs of conductors may be used but Pair 1-2 and Pair 3-6 are conventionally used.

Also shown in FIG. 7 is a communication link 68 that may be used to share data that is being delivered between either first network device 40 and third network device 59 or between third network device 59 and first network device 40 with the slave or backup switch 42 that is not currently active but may be copied on some or all communications via this special link. The link is also useful for communicating management status and control.

In the FIG. 7 embodiment, redundant inline power may be provided in a number of ways, but a simple way to do so is to allow both master and slave to provide inline power simultaneously. As long as one is up, inline power will be available. Alternatively, the third device may negotiate with one or both for power resource allocation. Failure of the master results in transfer to the slave, as for data.

In the FIG. 7 embodiment, data redundancy may be provided as follows. First, the third device may conduct simultaneous redundant sessions with both redundant switches. If the master is detected as having failed the slave takes over on the uplink to the network. Second, the slave may monitor all third device-master communications to detect fault-like behavior. The monitoring may be accomplished (1) by copying the slave over link 68 from the master; (2) by copying the slave from the third device over cable 3 pairs coupled to the slave; or (3) by providing some other link to the slave (e.g., wireless) so that it may monitor communications. This configuration may provide more fail-safe redundant data and or data/power since both the first network device and the second network device are, in effect, acting as masters at the same time.

Alternatively, the FIG. 7 configuration may be used to simultaneously route essentially identical communications from both first network device 40 and second network device 42 through selection device 32 acting completely passively and to third network device 59. Third network device 59, receiving both redundant signals, can make its own decision as to which communications path (the one via first network device 40 or the one via second network device 42) to employ. Since in FIG. 7 two pairs are shown making up the first network device 40 to third network device 59 link, that link may support up to 10/100 Base T Ethernet. The same is true for the link between second network device 42 and third network device 59. Network device 59, however, receives all four pairs.

This approach is desirable because it reduces selection device 32 to a simple assemblage of connectors and wires with no active components whatsoever.

Figure 8:
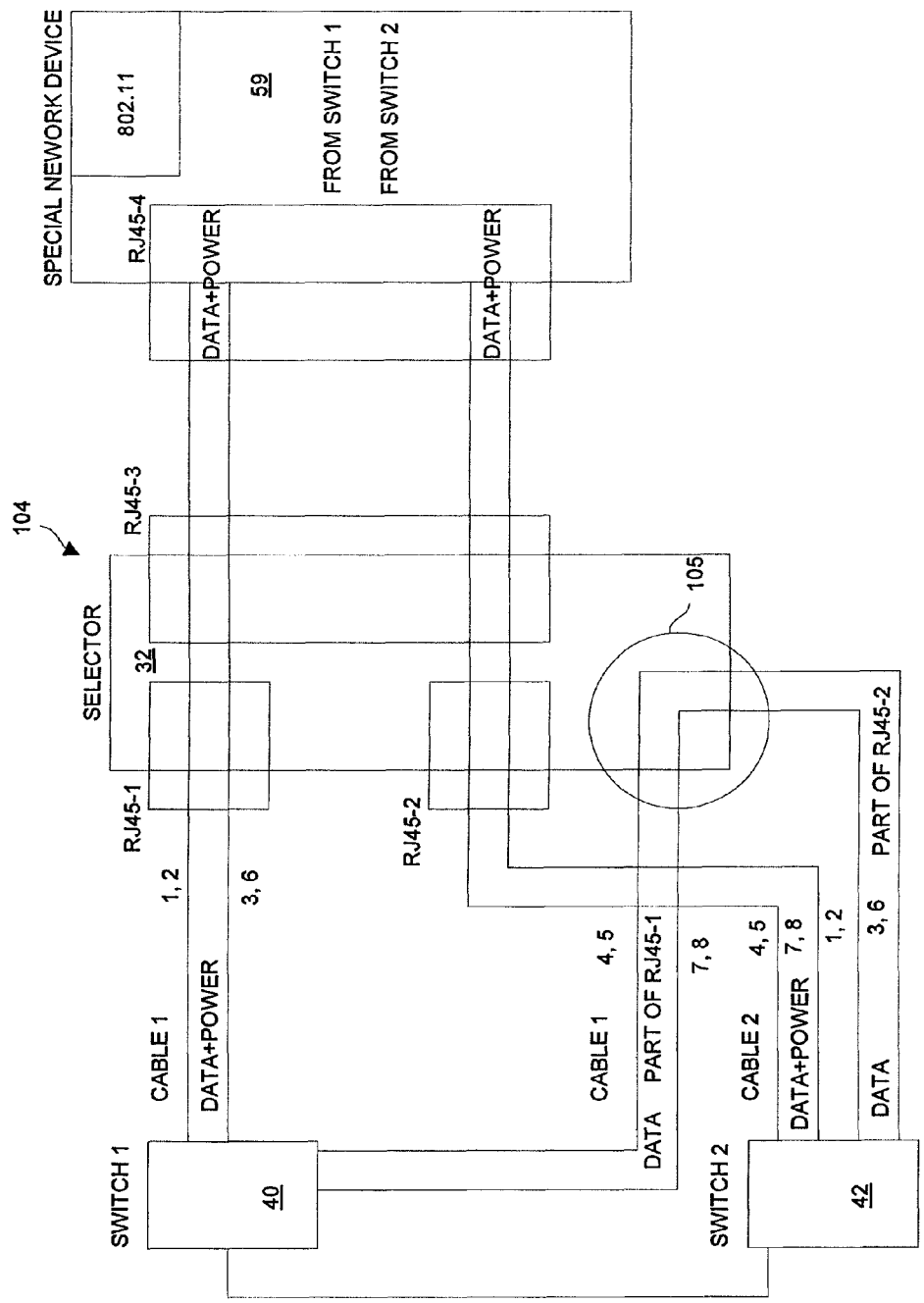
FIG. 8 is a block diagram of a segment of a wired data telecommunications network including a pair of redundant network devices providing redundant inline power and/or 10/100 Base T Ethernet data redundancy to a third network device in accordance with an embodiment of the present invention.

FIG. 8 is a block diagram of a segment 104 of a wired data telecommunications network including a pair of redundant network devices 40, 42 providing redundant inline power and/or 10/100 Base T Ethernet data redundancy to a third network device in accordance with an embodiment of the present invention. In accordance with this embodiment of the present invention, the selection device 32 additionally provides a connection 105 between the redundant network devices. This may be instead of or in addition to dedicated link 68. Thus, Cable 1 uses two pairs of its four pairs to couple 10/100 redundant power and data to the selection device from the first network device. Its other two pairs are used to form a data link between first network device 40 and the selection device 32 which continues via Cable 2 on the normally unused pairs to second network device 42. The selection device 32 configures its wiring to allow a dedicated 10/100 connection between the two switches which can be used for data transfer, management, status exchanges, controls and the like. The third device 59 may be provisioned with one or more data switch port connectors. If one port connector is provided, the redundant signals are provided one per pair of conductor pairs to that port connector. If, for example, two connectors are provided, one may be used for communications with the first network device and the other for communications with the second network device. Data being communicated with the master may be passed along to the slave so that it may perform a monitoring function to see if a failure has occurred.

In one embodiment of the present invention, the data exchanged between the first network device 40 (master) and the third device (59) along with status, control, management and similar data are passed from the third device to the second device 42 (slave) at all times via a local Ethernet switch on board of the third device that has a PHY capable of transmitting on two pairs of conductors at the same time (or has two PHYs).

Thus, the second network device (slave) now may actively monitor all of the traffic in both direction on the active link (master-third) via its connection with the third device. It will look for signs of certain problems, and, if such problems arise, the second device would notify the other two devices and take control. Also, such a control change may be requested by any device attached to the selection device 32. Upon such a change of control, the roles will be reversed, i.e., first network device would become slave and receive on two pairs and the active link becomes the connection between the third network device and the second network device. Where it is apparent that the device that was master has failed in some manner that would require that it not continue on as a slave, it may be disabled or shut down or disconnected, as appropriate, and an appropriate message sent to a network control point and/or service personnel.

In accordance with another embodiment of the present invention, the third device may initiate duplicate and exact data sessions between itself and each of the first network device and the second network device as if they were both masters or neither was master or slave. Only physical layer and minor differences would exist to allow the higher level protocol to understand the existence of such a logical duality for purposes of management and control. This would be similar to the same arrangement described above for the FIG. 7 embodiment.

In accordance with yet another embodiment of the present invention, the master communicates with the third network device, the third network device has a normal Ethernet connection with the second network device used for status, management and control. The third network device copies the second network device on all of its data communications with the first network device, leaving a receiver coupled to the second network device for receiving instructions to interrupt the session with the first network device, for example, and for receiving status, management and control signals from the second network device. While the first network device delivers the data it sends to the third network device over a separate conductor pair connected between the first and the second device. In this manner the second device can see the communications between the first network device and the third network device and can use a conductor pair that connects it to each of the other devices for purposes of communicating information relating to management, status and control. Note that inline power in this case will be supplied on both sets of pairs from each redundant network device to the third network device should it be required. Also note that the communication link 68 between the first network device and the second network device shown as a separate connection not affected by the selection device 32 may be used for sharing information, management, status exchange and control information. This configuration may provide more fail-safe redundant data and or data/power since both the first network device and the second network device are, in effect, acting as masters at the same time.

Figure 9:
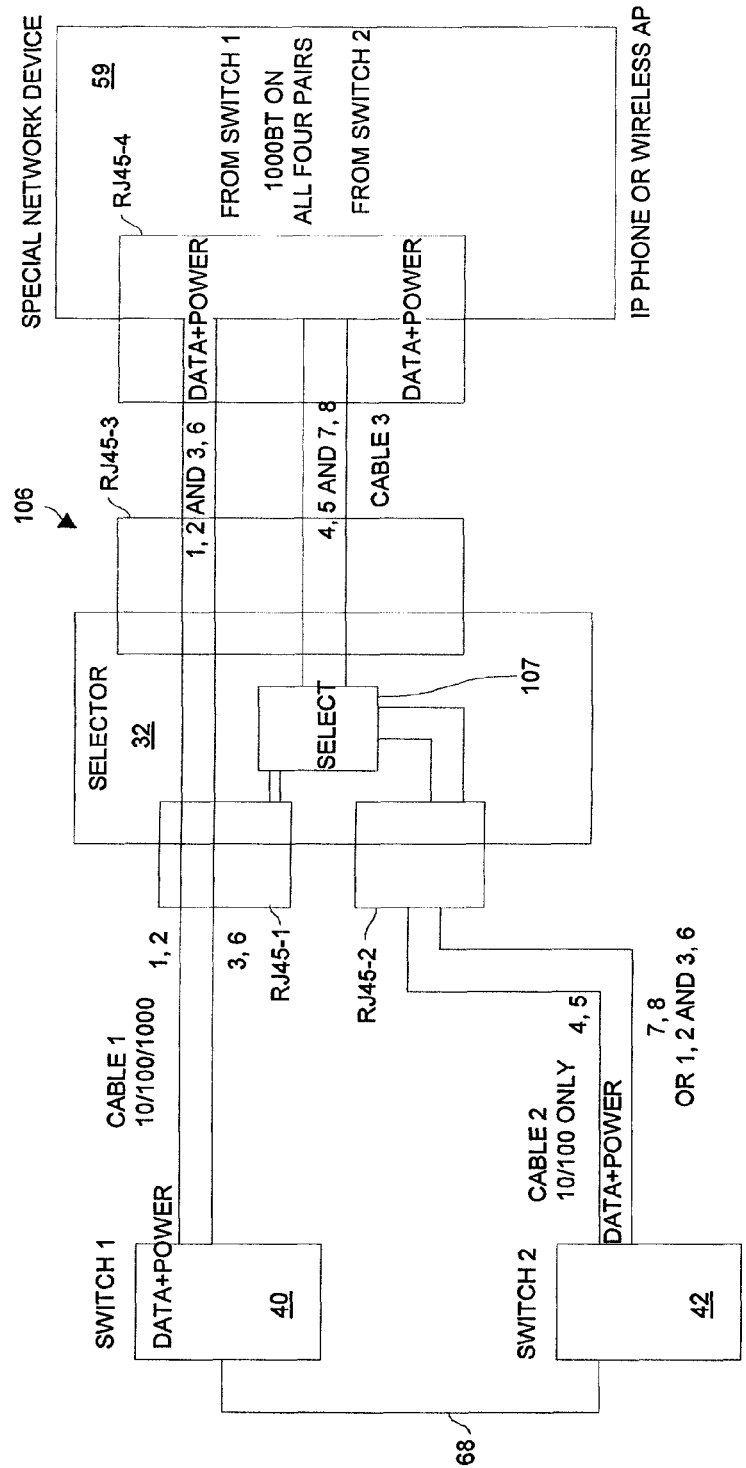
FIG. 9 is a block diagram of a network segment in accordance with an embodiment of the present invention where a 1000 Base T (or higher) Ethernet link uses a three cable selection device to configure a redundancy using 100 Base T Ethernet or lower.

FIG. 9 is a block diagram of a network segment 106 in accordance with an embodiment of the present invention where a 1000 Base T (or higher) Ethernet link uses the three cable selection device 32 to configure a redundancy using 100 Base T Ethernet or lower. As shown in FIG. 9, four pairs of conductors in cable 1 couple first network device 40 with selection device 32 to provide up to and above 1000 Base T Ethernet connectivity to third network device 59. Cable 3 couples selection device 32 with third network device 59 and can similarly provide up to and exceeding 1000 Base T Ethernet connectivity. A communications link 68 (two or four pairs of conductors) couples first network device 40 and second network device 42 as discussed above. Second network device 42 can monitor conditions over link 68 via first network device and/or via cable 2 (which is shown in this embodiment as supporting only two pairs of conductors and hence is limited to 100 Base T Ethernet and similar). The circuit block 107 labeled "select" is described in more detail below. Its function is to route signals on one or both of Pair 4-5 and Pair 7-8 between second network device 42 and one or both of first network device 40 and third network device 59 via either sets of pairs ((Pair 1-2 and Pair 3-6) or (Pair 4-5 and Pair 7-8)) providing a 10/100 redundancy capability should the 1000 Base T Ethernet provided between first network device 40 and third network device 59 fail in some fashion.

Figure 10:
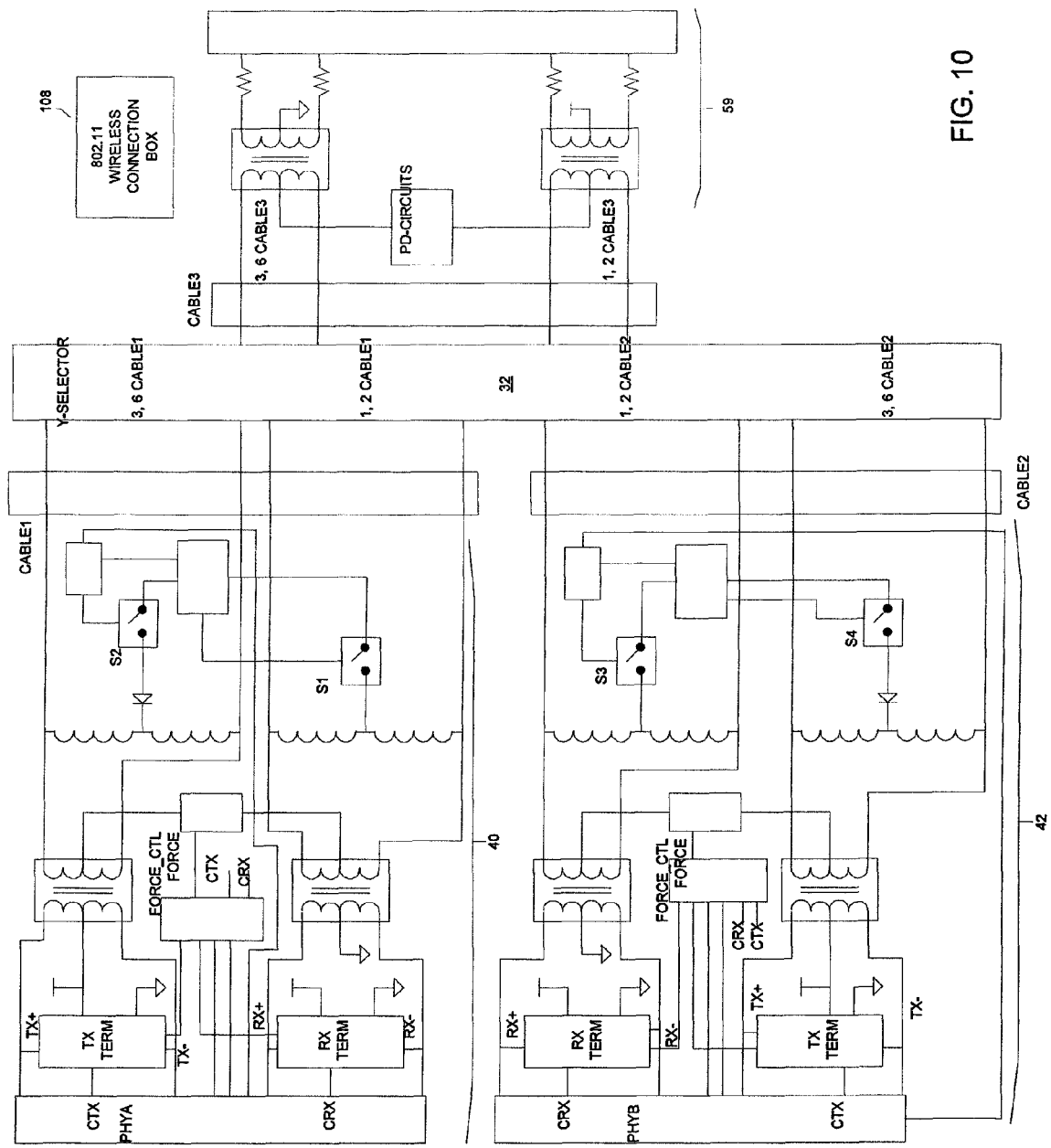
FIG. 10 is a simplified electrical schematic/block diagram of the network segment of FIG. 9.

FIG. 10 is a simplified electrical schematic/block diagram of the network segment 106 of FIG. 9. It shows a selection device for 10/100/1000 Base T Ethernet redundancy showing two pairs from first network device 40 and second network device 42 as well as cable 1, cable 2, cable 3 and the third network device 59. Although only two pairs of conductors are shown a four-pair configuration would be easily supported. Block 108 of third network 59 is provided as an optional back-up communication capability for third device 59. It provides a wireless network link back to a node on the wired data telecommunications network in case of a failure of the wired connectivity to third network device 59 as, for example, due to a severed network cable. Note that in most of the embodiments described herein, a single pair of conductors may be utilized for half-duplex communication such as control, management and status signaling.

Signal diodes may be used for handling the switching functions described herein. This is possible because a diode without DC (direct current) through it is off so it acts as a high impedance. It has leakage, breakdown voltage and capacitance that can affect or "load" an AC (alternating current) signal, however those problems are not an issue as long as the diode chosen has a low on-resistance (RDS-ON) (preferably much less than 100 ohms in an Ethernet implementation—the characteristic impedance of the Ethernet cabling) and it is selected to carry the DC current requirements placed on it by the inline power delivery capabilities of the system. When using diodes, it may be desirable to "match" the diodes for each pair of conductors, i.e., have them fabricated on the same die and/or in the same package, so that parasitic capacitance is minimized and the signal does not thereby become unbalanced.

Figure 11:
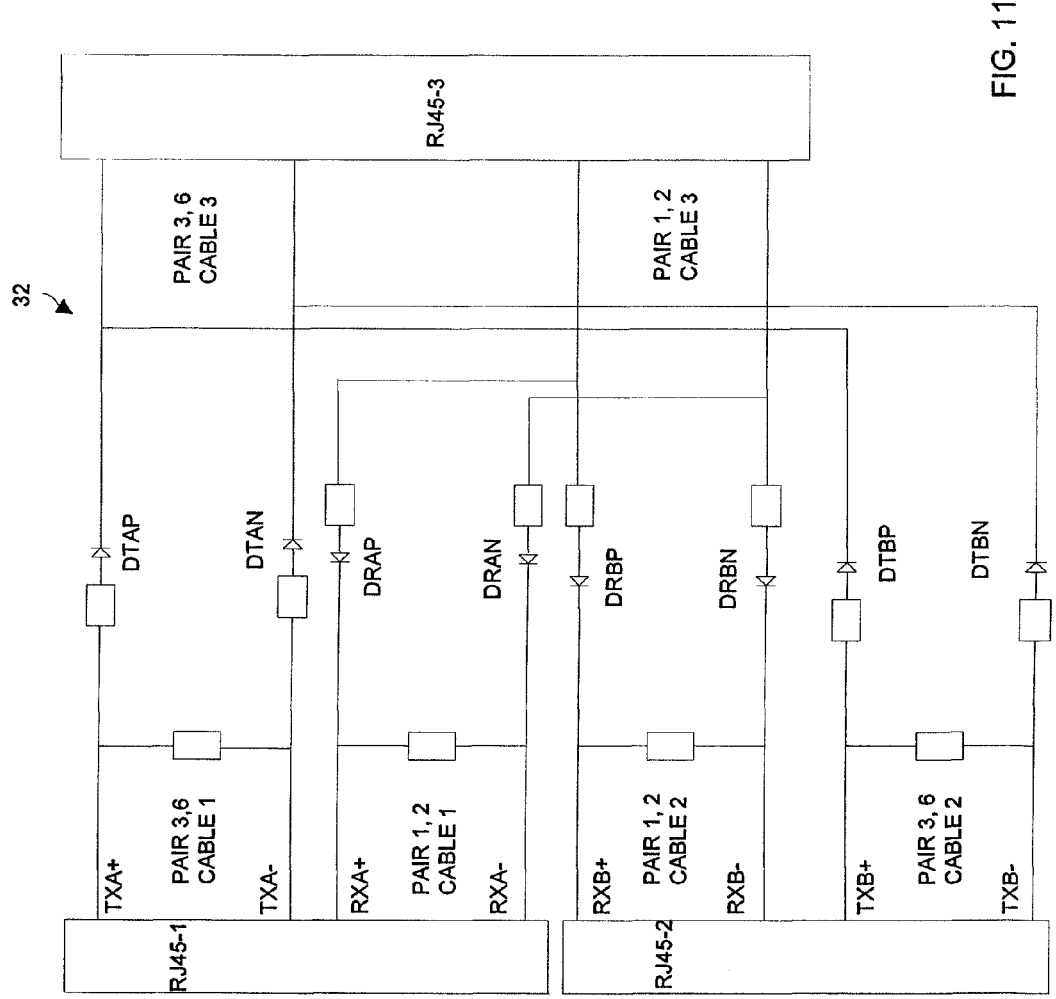
FIG. 11 is an electrical schematic diagram for a Y-type selection device in its simplest form, where 2 pairs are shown but the other 2 pairs also look similar (i.e., they do not merely pass through the selection device).

FIG. 11 is an electrical schematic diagram for a Y-type selection device 32 in its simplest form, where 2 pairs are shown but the other 2 pairs also look similar (i.e., they do not merely pass through the selection device 32). Note that a single-pair identity network may be deployed as shown (boxes labeled ID may be some component or collection of components capable of being recognized by how they respond to an applied signal (or how the signal responds to them)). This is true for all configurations described herein wherever such an identity network would be desirable. Inline resetable fuses F1-F8 are also shown and may be employed to protect signal diodes from harmful signals. They may also be used in any of the configurations illustrated herein but are not always shown to avoid overcomplicating the disclosure.

In the embodiment illustrated in FIG. 11, inline power DC current is utilized to bias the signal diodes (DTAP, DTAN, DRAP, DRAN, DRBP, DRBN, DTBP, DTBN) ON for data transfer. No effort is made to attempt to accommodate legacy non-PD devices in this embodiment. Inline power DC current from one network device at a time is supplied over each pair to allow data communication to succeed and to supply power to the third device (coupled to RJ45-3), this selector may support legacy devices if they provide the typical 150 ohm center tap termination as that termination will draw enough current to forward bias the signal diodes. The requirement of the selection device 32 is that the total capacitance of the diodes is no more that a few picofarads. It is also preferable that each pair of diodes (e.g., DTAP, DTAN) be closely matched in characteristics and have low leakage characteristics as discussed above. Also note that as in other cases, the crosstalk must be minimized and printed circuit board traces must be able to handle the DC current required without affecting the 100 ohm differential impedance. Additionally, the signal diodes must be able to handle at least half of the inline power DC current required to operate in a maximum load configuration plus some margin. None of these requirements are difficult to surmount and many commonly available diodes are suitable for these applications.

In accordance with one embodiment of the present invention, the third network device may request that the PSE associated with the first network device raise its current limit temporarily above the rating of the inline resetable fuses in order to help the third network device induce a reset for purposes of restoring the proper impedance, thus allowing data to flow from the second network device. This may be needed, for example, if a diode fails to a short and the first network device cannot remove the inline power for some reason. In that case the third network device may elect to open up a current link by forcing a non-resetable type of fuse to open (permanently) so that a second network device may take over control.

Figure 12:
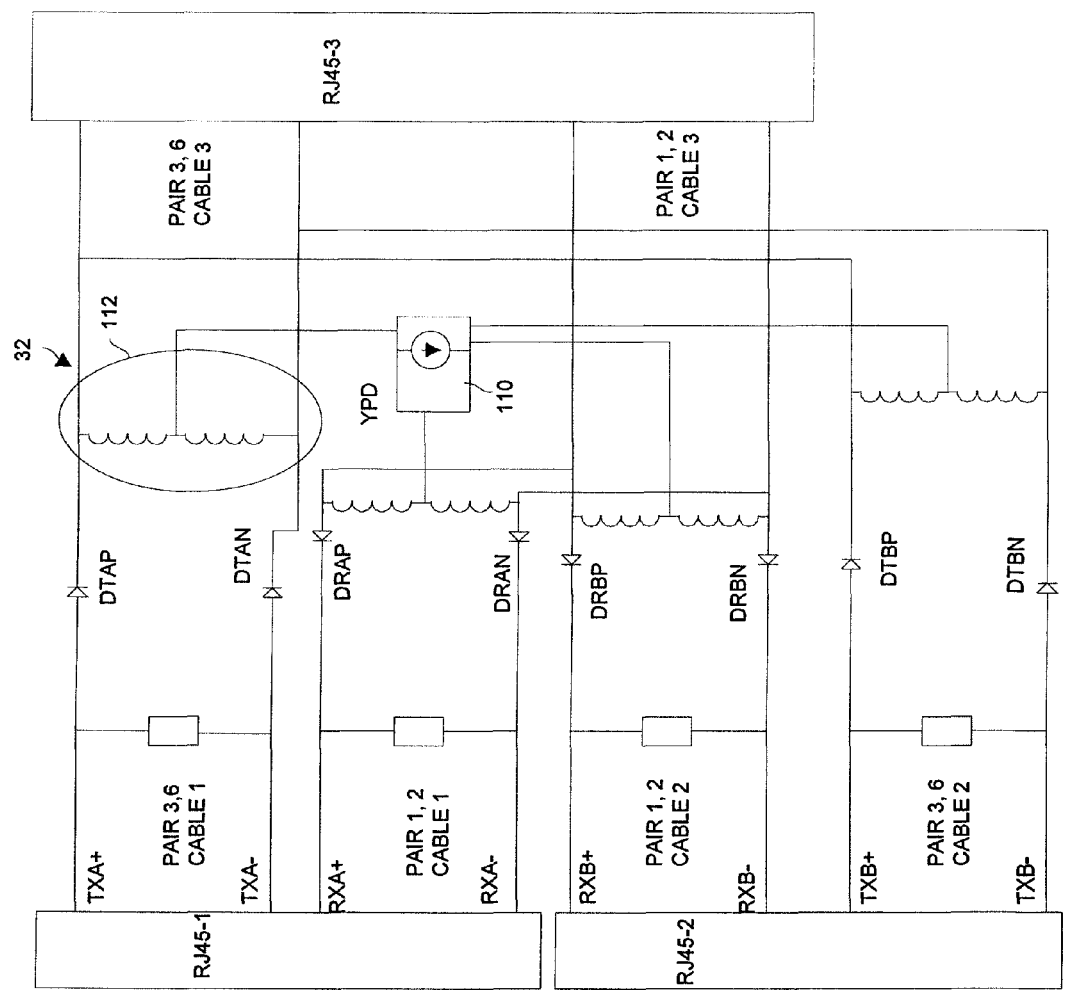

FIG. 12 is an electrical schematic diagram of the selection device of FIG. 11 but with an added local PD 110 in the selection device 32 to bias the diodes ON making the connection compatible with legacy Ethernet or possibly with a switch where no PD is available to draw DC current for inline power to keep the diodes biased ON. So a non-PD third network device coupled to the RJ-45-3 connector can see valid Ethernet signals at any speed and first and second network devices may communicate among themselves by either of them turning on a DC voltage that the local PD 110 in the selection device 32 would use to draw current with which to bias the diodes ON allowing data transfer or signal exchanges. This works, for example, as follows: If Pair 3-6 at RJ-45-1 is to be coupled to Pair 3-6 at RJ-45-3, diodes DTAP and DTAN need to be forward biased (ON) while diodes DTBP and DTBN are biased off. Switching the biasing so that DTBP and DTBN are ON and DTAP and DTAN are OFF couples Pair 3-6 at RJ-45-1 to Pair 3-6 at RJ-45-3. Diode control is handled n a conventional manner at circuit box 110. Applying a voltage at the center tap of a magnet device such as a transformer or a pair of inductors (112) allows the DC signal to be applied without affecting the AC data signal which is blocked by the inductors.

Figure 16:
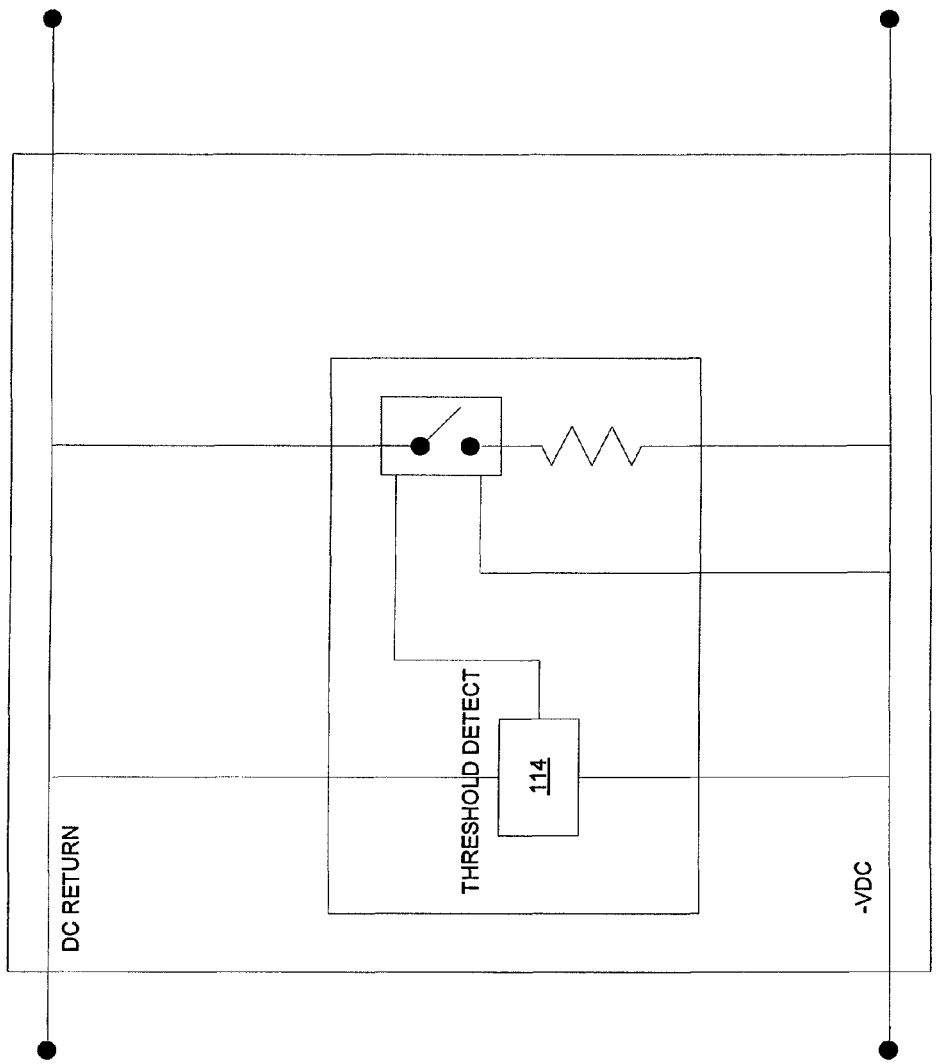
FIG. 16 is an electrical schematic diagram of a PD circuit like that used in the embodiment of FIG. 12.

The PD circuitry which may be used in this configuration to power the diode control block 110 is illustrated in FIG. 16 below. One of the advantages of such a PD circuit is the fact that it presents a high impedance above an idle voltage level (e.g., above 5 VDC) of inline power so that it does not interfere with the discovery and classification processes such as the discovery of the 25 k resistance required by the IEEE 802.3af standard. It remains high impedance in the classification voltage range and can return to low impedance once regular (48 VDC) inline power is applied, if desired. The current drawn by this PD below 5 VDC presents, in effect, the equivalent of a double-pair common mode identity network in itself that allows the coexistence of the IEEE identity network (25 k ohms) in parallel with this PD. This paralleling requires that only one PD present itself at a time, hence, above 5 VDC of applied inline power this identity network will shut itself off. The PSE supplying inline power to this pair of identity networks, should support the discovery of both—if it does not, only the legacy 25 k ohm resistance will be seen by the legacy PSE.

Figure 13:
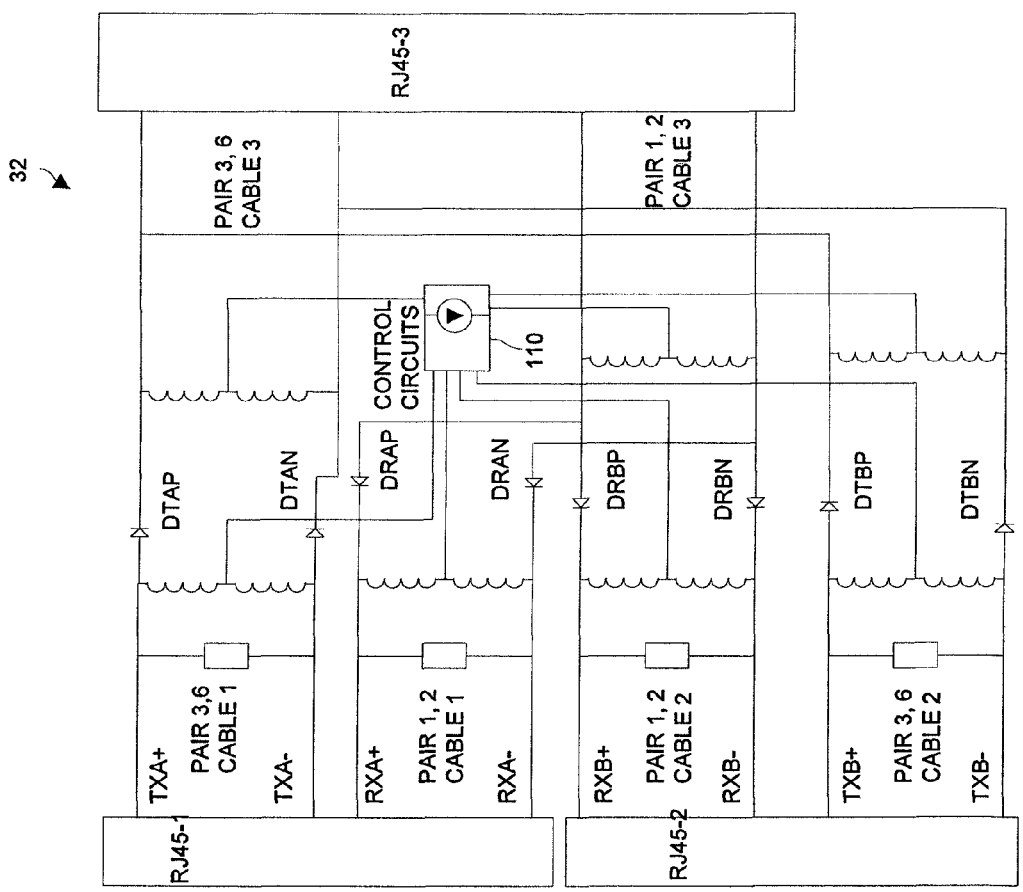
FIG. 13 is an electrical schematic diagram of a modification of the selection device of FIG. 12 providing additional circuitry that assists in control and fault recovery.

FIG. 13 is an electrical schematic diagram of a modification of the selection device of FIG. 12 providing additional circuitry that assists in control and fault recovery. It includes voltage demodulation and current modulation circuitry, and optoisolators or relays that may be used to force a device off by causing a short, also it may present a unique common mode signature with a passive or active identity network to any of the redundant network devices, it can monitor the status of the applied DC inline power voltages from the redundant network devices and, if desired, communicate any failures using common mode signaling. Common mode signaling may also be used among the redundant network devices and the third network device for purposes of control, management and status exchange relating to data and inline power.

Note that if cable 1 and cable 2 attaching first and second redundant network devices to the selection device 32 are relatively short in length (dependent upon the data rate) then it is possible to have all diodes ON in the selector coupling each conductor to each leg of the "Y" similar to the approach used in commonly owned U.S. patent application Ser. No. 11/000,734 now U.S. Pat. No. 7,849,351 filed on Nov. 30, 2004 and entitled "Power and Data Redundancy in a Single Wiring Closet" in the names of inventors Roger A. Karam and Luca Cafiero.

The redundant network devices in this case have a master-slave relationship where one is actively communicating with the third network device while the other listens in on data traffic on some or all pairs. The approach for managing such a connection is discussed in detail in the aforementioned application.

In accordance with another embodiment of this invention, a 10 Base T Ethernet fall back redundancy could be provided as a full duplex normal Ethernet connection between the first network device and the third network device, while the second device may actively listen (with its diodes biased ON to short all three cables on a conductor by conductor basis) using the dynamic impedance adjustment techniques of the aforementioned application and it may even supply inline power on the two active pairs for communication (i.e., all diodes would be biased ON from both first and second network devices). Cabling between the selection device and the first and second network devices would typically be kept to under one meter in length while there would be no additional restriction on the cabling to the third network device. This would provide a redundant capability at low speed while repairs could be effected.

Figure 14:
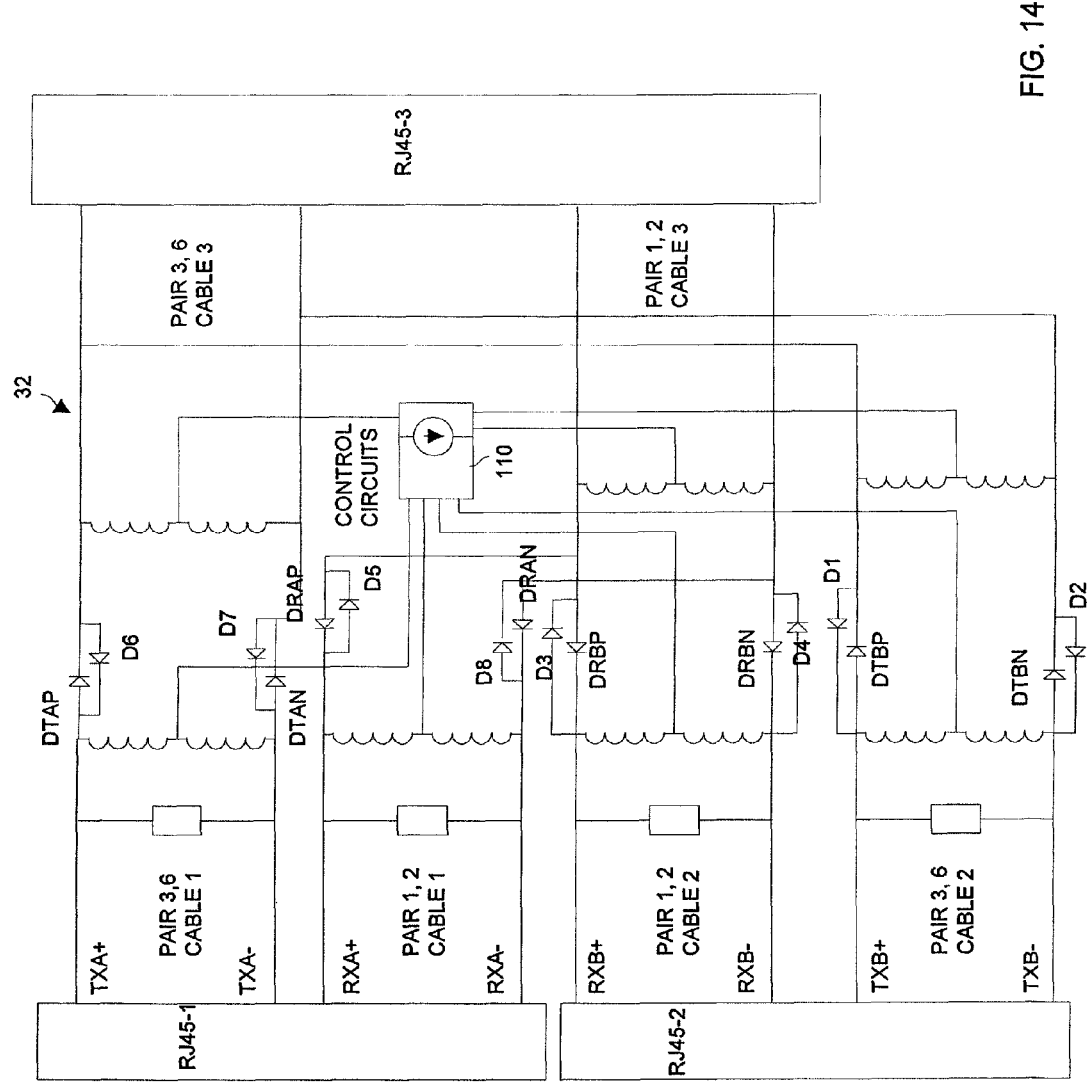
FIG. 14 is an electrical schematic diagram of a selection device in accordance with another embodiment of the present invention.

FIG. 14 is an electrical schematic diagram of a selection device 32 in accordance with another embodiment of the present invention. In this version two extra diodes (D1-D8) are added to each pair (one per conductor) that are configured to conduct in the opposite direction (e.g., diode D6 is added to bridge diode DTAP). They are normally off, but, by adjusting the biasing provided by circuit block 110, operating under control from the redundant network devices, may be turned ON so as to allow first or second network device 40, 42 to change its mode of operation from being a PSE to being a PD for purposes of initiating a communication between two or more of the coupled network devices. As an alternative, the selection device 32 may deploy one set of such diodes (D1-D4) (instead of the two sets) in order to make such a task possible from the second network device 43 (slave) only. If the PSE associated with the second network device 42 were to pull DC current by presenting a load (i.e., a current source that draws current from the PSE associated with the first network device 40 over one or both of Pair 3-6 and Pair 1-2 and sends it out to the PSE associated with the second network device 42 over one or both of Pair 1-2 and Pair 3-6 via diodes D1, D2 and D3, D4 respectively, then it may interfere with data transfer between the first and third network devices and initiate its own communication with both devices using a special sets of pulses that are low enough in frequency to be received by all attached devices since data traffic especially 100 Base T Ethernet and higher would be impaired should such a task start. Also fast link pulses (similar to those used for autonegotiation as defined in the IEEE 802.3 specification) may be used to communicate among three or more devices over one pair of conductors to present the sender's identification, the receiver's identification and start and end of communication for purposes of management, status exchange and control. Also, under some circumstances 10 Base T Ethernet packets may be received by the three network devices without regard to cable length (as long as it meets the IEEE 802.3 specification, i.e., cable1+cable3 or cable2+cable3 are less than or equal in length to the total allowed by the IEEE 802.3 specification of about 100 meter of CAT-3 or better cable) and irrelevant of the stub's length, so 10BaseT Ethernet may provide more leverage in such communication and all devices may opt to lower their speed to keep the user content should that prove to be useful until problems are solved.

Figure 15:
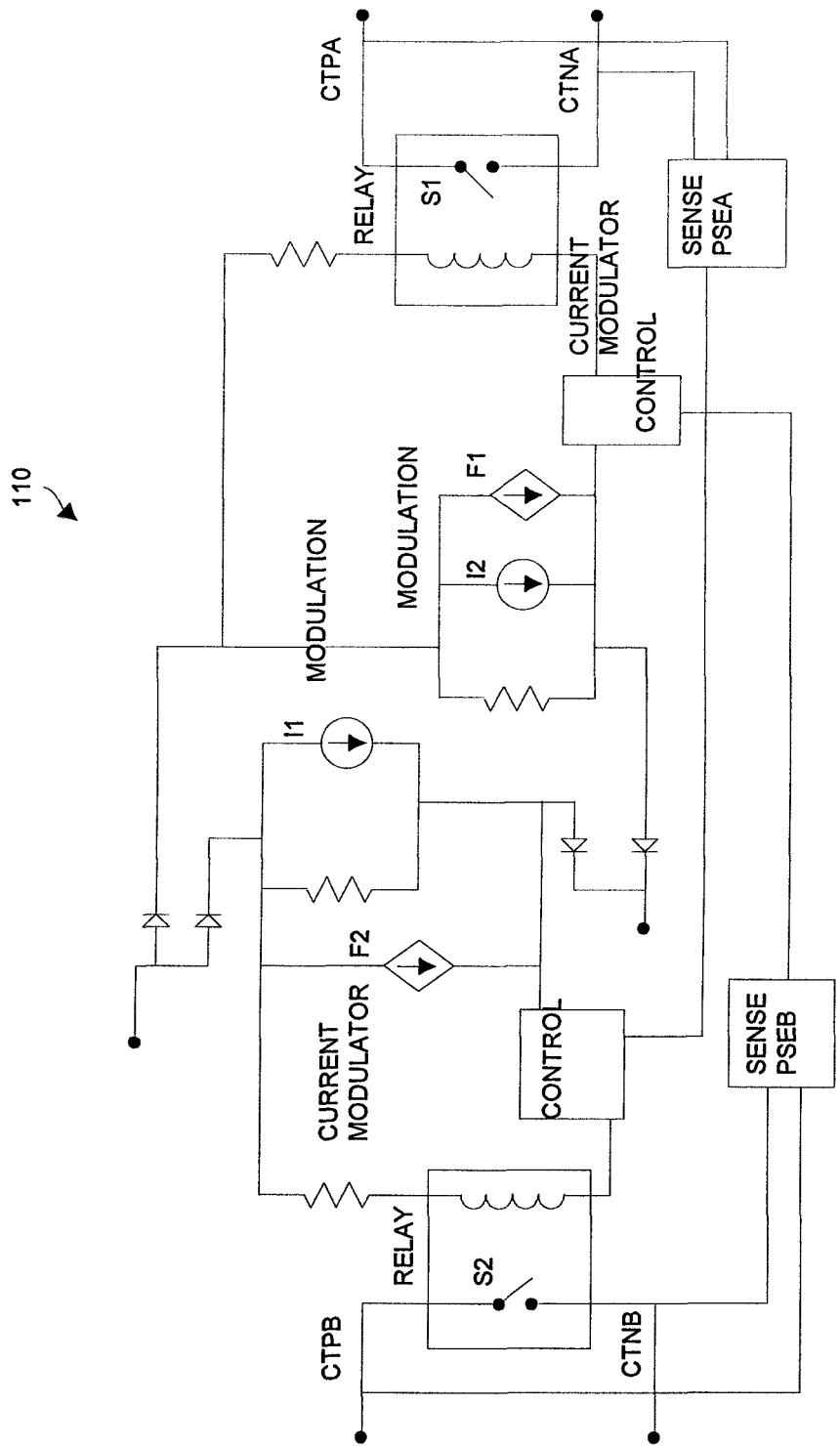
FIG. 15 is an electrical schematic diagram of a circuit block for controlling diode biasing as in FIG. 13.

FIG. 15 is an electrical schematic diagram of a circuit block 110 for controlling diode biasing as in FIG. 13. This special PD circuit for use in the selection device 32 is adapted to carry out common mode communications between itself and other attached PDs/PSEs. The circuit block 110 of FIG. 15 has some special features. First, switches S1 and S2 are provided to force short circuits across nodes CTPA-CTNA and CTPB-CTNB, respectively. This provides a mechanism for turning off attached PSE devices which will respond to a detected short by shutting down. Current modulation circuitry is provided for each of two attached PSEs so that common mode communications may be supported with such attached PSEs. This is accomplished with current sources F1, F2 which may be switched on and off to create a modulated current signal in the online power signal which is detectable back at the PSEs. Devices I1 and I2 may be simple current sources providing bias currents to turn the signal diodes ON.

If second network device 42 supplies a DC voltage much less in magnitude than that supplied from first network device 40, a dual PD circuit may be employed (one corresponding to each PSE). This approach is helpful if active circuitry failure is a concern, or it is important to provide backup control. This approach permits forcing the first network device (40) to power off by causing a short across the port say at, for example, nodes CTPA and CTNA. If such a short is forced, first network device 40 would be expected to shut down its PSE circuitry. It is also possible to force the diodes (DTAP/DTAN, and DRAP/DRAN) OFF causing a high-impedance connection at the selection device so as to allow the second network device 42 to take control of the wire without the AC loading that would be present should the inline diodes in series from the first network device refuse to turn off or if first network device 40 were to refuse to shut its inline power down. Such a request may be initiated using common mode communications, or other available means. Also the inline power voltage in the switches or the bias voltage in case of legacy Ethernet may be increased or decreased a few volts to insure ease of control in such situations. I.e., if both voltage were exactly equal and the cables and diodes characteristics where exactly matched, then if the PSE associated with first network device 40 were to refuse to shut down, data transfer would potentially be impaired unless the two cables were relatively short in length to allow successful data transfer and not to affect the 100 ohm impedance required for the link.

Also, circuit block 110 of FIG. 15 provides lower DC current bias to allow a legacy device (no inline power required) to communicate with the first and second network devices in a data-only mode of operation. Another function which may be provided in circuit block 110 is a voltage sense feature allowing the Local Y PD to make sure that inline power or any DC voltage applied is within the specifications. If not, the YPD may use various communications signaling capabilities available to it to force a change in the slave-master relationship on its own. Active circuitry may be added or subtracted here as see fit in order to facilitate the coordination, management and control of the link. For example, status indicators such as displays and status lights may be added.

FIG. 16 is an electrical schematic diagram of a PD circuit 110 like that used in the embodiment of FIG. 12. PD circuit 110 of FIG. 16 is a special PD that is ON (i.e., it draws a few mA to bias the signal diodes ON, allowing the data AC (alternating current) signal through) when the PSE power is "OFF". In this case the PSE still supplies low inline DC power to permit the biasing of the diodes above a few volts (e.g., about 5 VDC or less). The threshold detection circuit 114 operates to control the state of switch S1 based upon the applied inline voltage. For certain voltage ranges, the switch S1 is closed and the load represented by the PD is powered by inline power, in other voltage ranges it is not. It is expected that this circuit will be used to allow diode biasing power to be provided during idle and (if needed) during full regular inline power conditions but not under discovery and classification conditions. Alternatively, the diode biasing power can be provided when regular inline power is not present (but idle power is present) and turns off during all other conditions. By providing biasing power to the diodes during non-powered times, the signal paths remain open through the diodes for data communications.

When the threshold detection circuit 114 determines that the inline power has an out of range voltage (e.g., discovery or classification and possibly regular inline power) the PD appears as a high impedance allowing the easy discovery of the conventional IEEE 802.3af identity network (25,000 ohm resistor) in the PD or third device. If the third device is not a PD then the PSE will supply such small DC current at low voltages to keep the diodes low impedance for data transmission. The threshold detection circuit 114 senses an applied voltage above about 5 VDC (i.e., above idle) and, in response, opens switch S1 so that the circuit looks like a high impedance when voltages above about 5 VDC (e.g., discovery, classification or regular inline power) are applied. Below that voltage level (i.e., at idle), the switch is closed exposing the load to the small amount of power available. If desired, the threshold detection circuit 114 may close switch S1 again when normal inline power (around 48 VDC) is applied. This can assist in making the identity network discoverable and avoiding conflict during the discovery and classification stages prior to application of regular inline power.

If, as in some embodiments of the present invention discussed above, the PSEs of the first and second network devices are coupled together and either PSE on the wire goes high while the other tries to determine the presence of the Y device, it would see a high impedance also (since the PSEs would be analog OR-ed in that case). For this purpose, the controller inside the PSE must be able to sense the voltage on the wire, i.e., to see if the 48 VDC is present, or if there is a discovery or classification cycle taking place (i.e., a voltage greater than about 5 VDC is present). In that case it knows to back off and try later. Such back off timing may be a value of time that is predetermined or agreed upon among the devices, or the PSE may monitor via its high impedance sensing the wire voltages and seize the wire for its own search for a PD and the selection device's common mode identity network at the first chance where the cable voltage drops below the right value. At that instant, the selection device acting as a PD would draw a pre-determined value of DC current from each switch that they can both measure. This negotiation can also be handled by any other available communication system including wireless and common mode. Also note that the PSE controller should be capable of detecting an identity network signature (such as the IEEE 802.3af standard 25,000 ohm resistance signature). This can be accomplished in a conventional manner by taking into account the voltage drop through the various diodes.

Another function of this PD is to flag the presence of the selection device to both of the redundant network devices by using its unique identity network, i.e., the current it draws, that would go to zero above a few volts (i.e., above idle).

Figure 17:
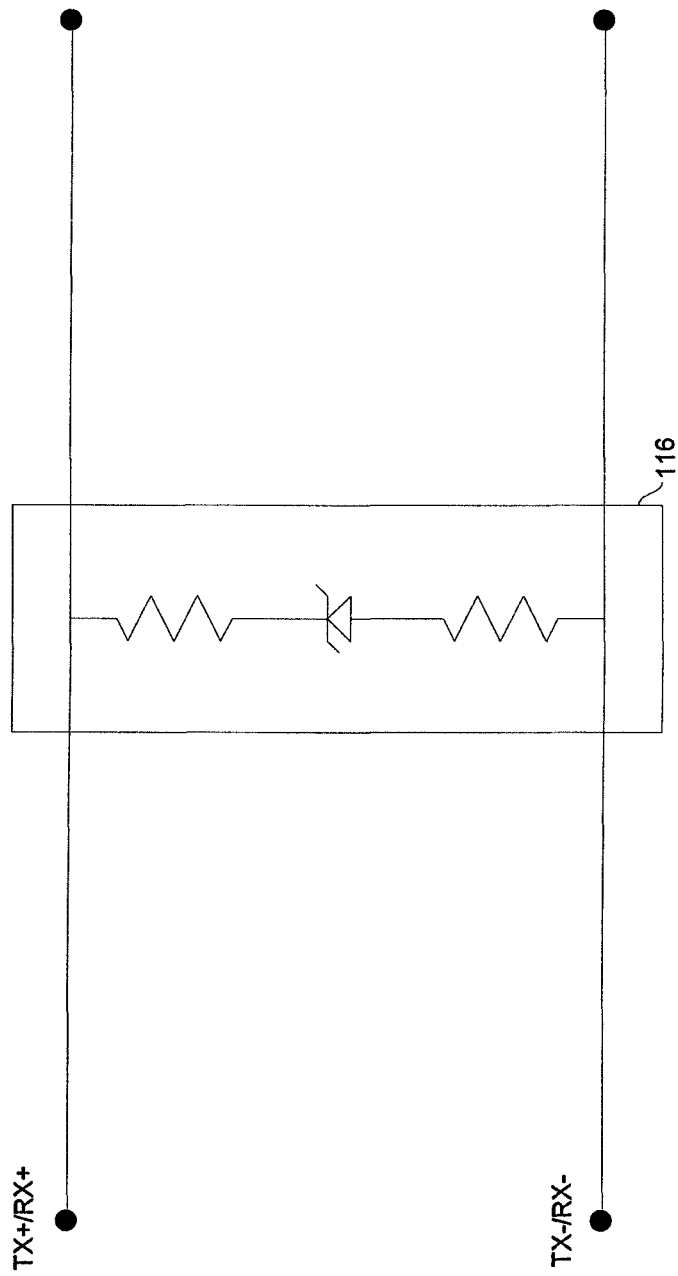
FIG. 17 is an electrical schematic diagram of an example of a single-pair identity network.

FIG. 17 is an electrical schematic diagram of an example of a single-pair identity network 116 as used in some of the preceding circuits. The identity network 116 includes a zener diode D1 coupled to a pair of conductors through a first resistor R1 and a second resistor R2. It operates by causing a unipolar reduction in voltage amplitude to a differential voltage pulse traversing it—this causes a reduction in the voltage amplitude of the pulse where the pulse voltage amplitude significantly exceeds the threshold of the zener diode D1. Such a network 116 would allow a TDR (time domain reflectometer—these are commonly present in PHYs) or a similar technique to detect the presence of something other than a 100 ohm impedance when a special signal is applied, flagging the presence of a special device (e.g., the selection device) on the wire. Note that such an identity network may be unique to each pair and thus be used to uniquely identify a particular pair of conductors or the function of such a pair of conductors. In one case resistors R1 and R2 may be 10 ohm resistors in series with zener diode D1 and the PHY sends a pulse that is much higher than the zener breakdown voltage causing the breakdown and the attenuation across the pair. This network is unipolar (the breakdown happens when one side is higher in amplitude than the other side) and so the PHY receives its own transmitted signal and it can detect the presence of the selection device. If only a 100 ohm termination was present the signal would be unmodified. Such a check may be performed periodically at lower frequencies when the link is down, or it can be initiated once a 100 ohm termination is detected. Note that under normal power and data operation this network is high impedance and low capacitance and therefore it does not affect the data. Variations (e.g., by varying the zener diode breakdown voltage and/or the value of resistors R1 and R2) may provide a series of similarly constructed but unique and differentiable single-pair networks.

Figure 18:
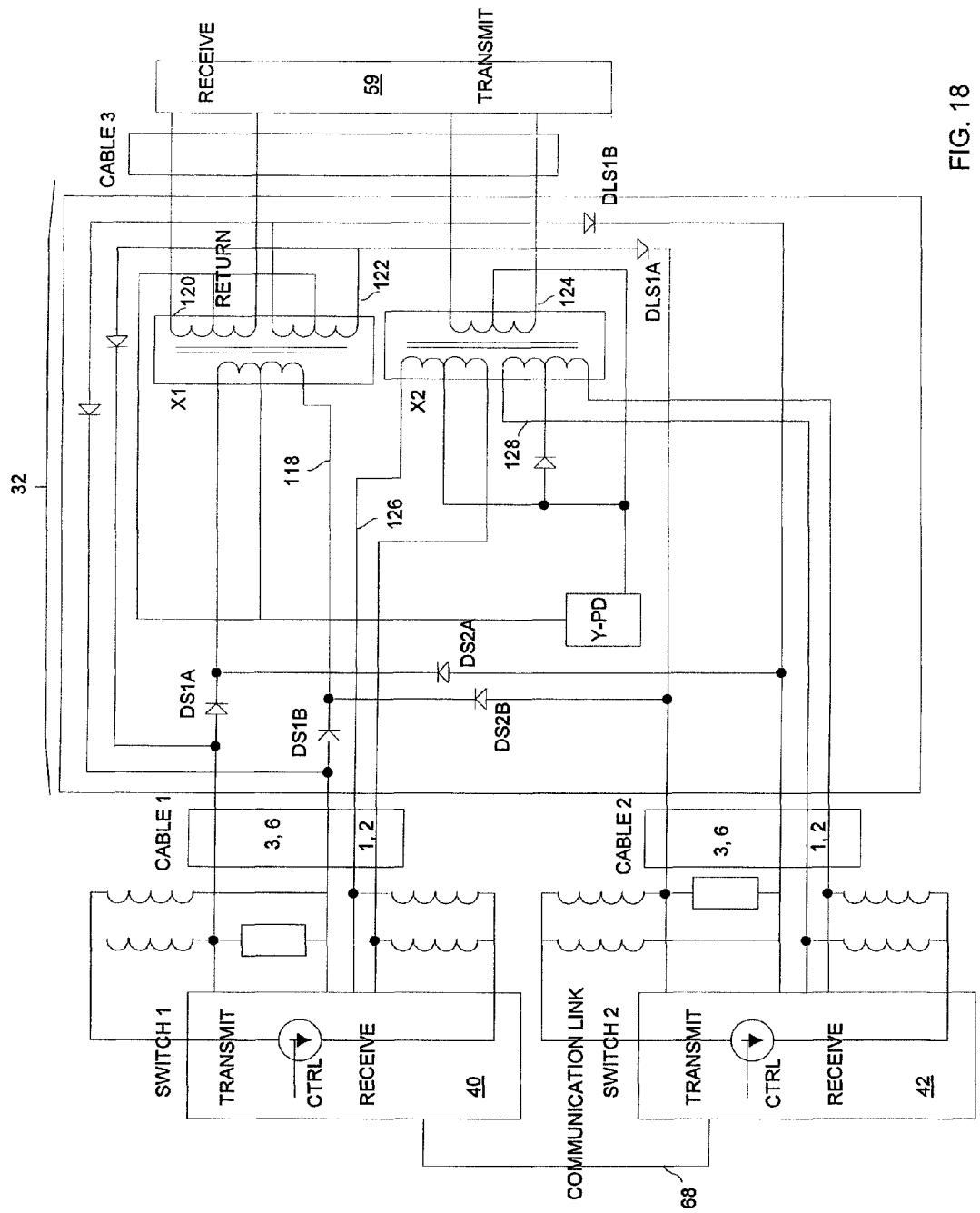
FIG. 18 is an electrical schematic diagram of another embodiment of the selection device in which a "splitter" magnetic (e.g., a 1:1:1 ratio transformer) is used.

FIG. 18 is an electrical schematic diagram of another embodiment of the selection device 32 in which a "splitter" magnetic (e.g., a 1:1:1 ratio transformer) X1, X2 is used. As can be seen from the figure, 1:1:1 transformer X1 has one primary winding 118 and two secondary windings 120, 122. Similarly 1:1:1 transformer X2 has one primary winding 124 and two secondary windings 126, 128. This embodiment allows a portion of the signal to return to the originating data source or to the redundant data source for purposes of error detection, recovery and control. Inline power traverses such a circuit without any difficulty. Such an approach may be deployed in a 10/100/1000 Base T Ethernet network where the receiver or the transmitter (but not both) can detect the presence of the selection device 32 and compensate for the 3 db loss the signal endures as it passes through this passive device (caused by the 1:1:1 transformer splitter). It operates by taking the transmit signal from first network device 40 on primary 118, splitting it into two signals on secondary windings 120 and 122. The signal on secondary 120 goes to the third network device as usual, however, the signal on secondary 122 is coupled back to the transmit side of first network device 40 and second network device 42. In this manner second network device 42 can use a receiver built into its transmit side to monitor transmissions from first network device 40 and vice versa.

Only two pairs are shown in FIG. 18, however, more pairs could be supported. Using the splitter magnetic costs about 3 db in signal loss, however this can be automatically compensated in the receiver by implementing a flat gain of 3 db across all frequencies. It may also be compensated for in transmitters once the appropriate selection device 32 is detected. The advantage of a receive compensation is that if the cable is short enough it may not be needed.

Diodes DS1A/DS1B and DS2A/DS2B act as switches to allow the data to flow from one of first and second network devices 40, 42 at a time. At times (i.e., early after the YPD is discovered, the first and second network devices 40, 42 may communicate with one another. This communication takes place in one of the following ways:

1) Diodes (DS1A/DS1B and DS2A/DS2B) will be biased ON to allow both switches to exchange pulses over their transmit channels to agree on the slave/master relationship upon the discovery of the YPD. To achieve this, each transmitter needs to act as a Transmitter and a Receiver using half-duplex signaling. A "protocol" similar to what Ethernet calls Auto-MDIX may be used where the transmitter backs off and listens for pulses so a PHY can redefine its transmitter as a receiver and vice versa. In this case we have the same transmitter acting like a transmitter, it backs off, it listens, it receives and then it is sent one or more special pulses to allow it to communicate. In the case of Auto-Mdix, once a transmit senses incoming energy during its backoff, it turns into a receiver and forces the receiver channel to become a transmitter on that same PHY. That would be the end of the "negotiation" and thereafter data transmission starts (in the case of a port being Auto-Mdix enabled). Effectively this provides a half-duplex single-pair communication path to negotiate status and implement management and control.

2) The switches communicate via pulses on their receivers, i.e., both receivers can use magnetic device X2 and communicate with either lower frequency pulses or pulses similar to standard Ethernet FLP (fast link pulses) to negotiate the slave-master agreement. The third device would need to see one or more "flag" pulses at the start of communication so that it shuts down its transmitter allowing both first and second network devices to exchange information while third network device may elect to monitor such conversations.

3) Diodes DS1A and DS1B are forward biased due to loading in the selection device 32 (a few mA) and, upon detecting the "YPD", the second network device 42 turns into a "PD-Like circuit" pulling a few mA and forward biasing diodes DLS1A and DLS1B. This allows second network device 42 to listen to first network device 40, and, once the "start communication" signal is received, after a small delay the other switch (40) acts like a PD and the roles are exchanged, i.e., first network device 40 uses diodes DLS2A and DLS2B to configure itself as a PD to receive the signal that second network device 42 transmitted into winding 118 after second network device 42 biases diodes DS2A and DS2B ON with a low-(idle) or high-voltage power signal, as applicable 4) Via a dedicated communication link (68) between the two switches.

5) Via common-mode PSE-PSE communication. Note how the receiver of each of the first and second network devices is automatically "copied" on packets coming from the third network device via magnetic X2. The purpose of diodes DLS2B/DLS2A, and DLS1B/DLS1A is to allow the slave switch to listen to the master, for example, the PSE of network device 42 would become a current source of few mA and thereby bias the DLS1A/DLS1B diodes ON. It would also listen to the packets out of network device 40 over the second winding of magnetic X1. Of course the return current to the inline power coming from PSE1 is through the receive pair on network device 42. In this manner network device 42 can see what both sides are talking about and break-in when it needs to. In second network device 42, when the current source is turned ON in its PSE the transmitter becomes a data receiver (by biasing diodes DLS2A and DLS2B ON). Also, potentially its transmitter can act like a transmitter and send information to the Transmitter of network device 40 when the YPD is discovered, by biasing DS1B and DS1A and/or DS2A and DS2B ON, and negotiating the Slave-Master relationship.

Note how the receiver of each of the first and second network devices is automatically "copied" on packets coming from the third network device 59 via magnetic device X2. The purpose of diodes DLS2B/DLS2A and DLS1B/DLS1A is to allow the slave network device to listen to the master. Essentially the PSE of second network device 42 would become a current source of a few mA to forward bias DLS1A/DLS1B and would listen to the packets out of first network device 40 over the second winding 118 of magnetic X1. The return current to the inline power coming from PSE1 is through the receive pair on the second network device 42. In this way the second network device can monitor communications on both sides and can thereby determine when to break in. So its own transmitter, i.e., that of second network device 42, when the current source is turned ON in its PSE becomes a data receiver (diodes DLS2A and DLS2B biased ON). Also potentially its transmitter can act like a transmitter and send information to the transmitter of first network device 40 when the YPD is discovered by biasing DS1B OR DS2A ON and DS2B ON, and negotiating the master-slave relationship. (Note that the YPD referred to here would resemble that of FIG. 16).

For the purpose of error detection, status checking and management, packets may be sent from the master to the slave periodically, during idle periods (i.e., periods where no data transmission is occurring). The selection device or the third network device may ignore these, i.e., they are meant to deliver a status message or a request to the slave switch, or are designed to inform both the second network device 42 and the third network device 59 that all is well.

Also, special test packets may be sent from the first network device 40 to the YPD of the selection device 32 and then, after an agreed-upon delay, they are sent out from the YPD to the second network device 42 to make sure that the first network device to YPD to second network device path is all well. Also the second network device 42 may either remain idle awaiting instructions or it may perform error checking on the traffic from the other network devices for purposes of making sure the link is up keeping itself at a point in the conversations that it can continue traffic as a master with minimum delay upon request. Other variances on this figure are possible where with the use of passive or even active circuitry provide more support for error discovery and recovery.

Figure 19:
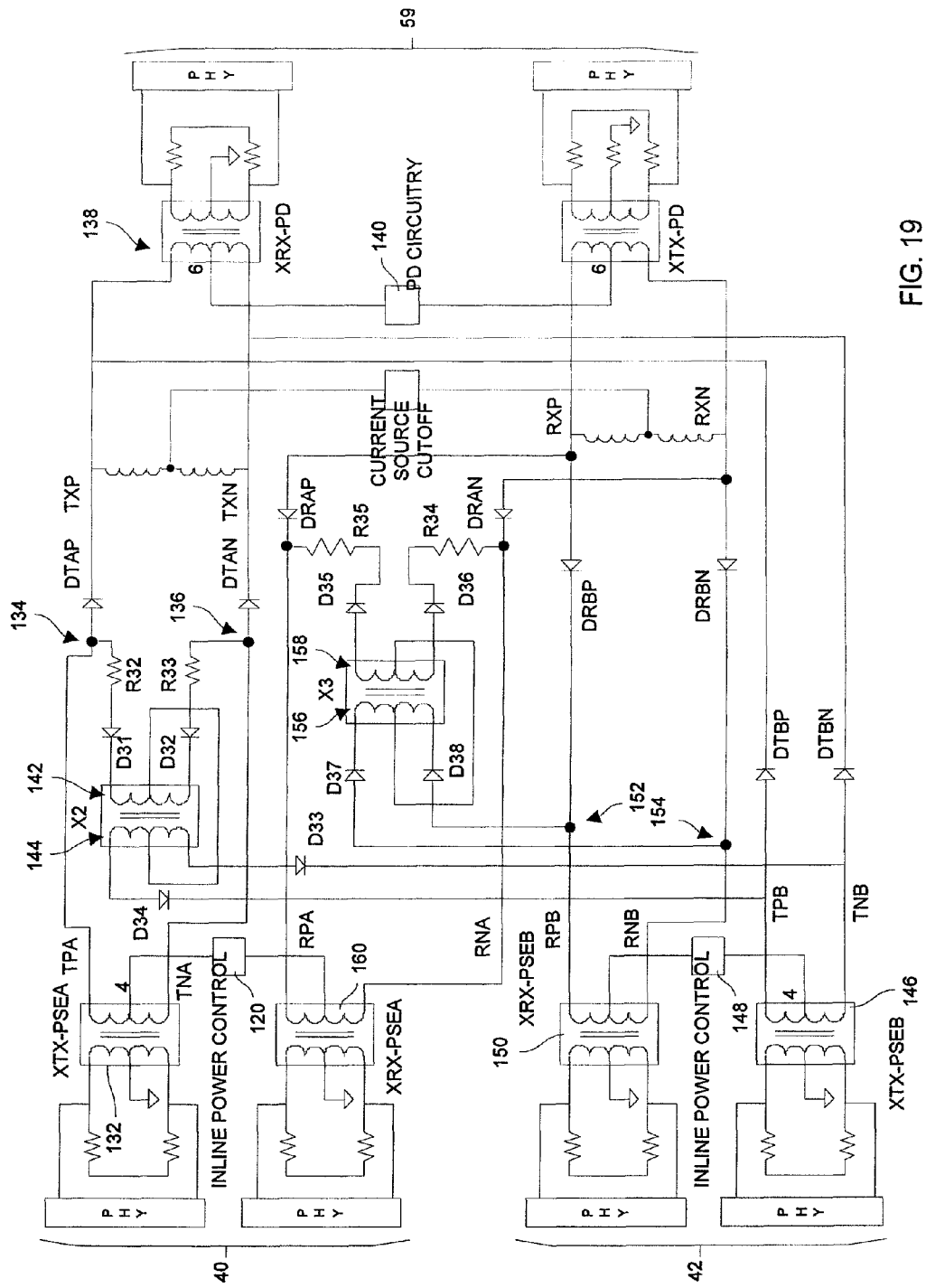
FIG. 19 is an electrical schematic diagram of an embodiment of the present invention which uses inline power and mostly passive components to allow a network device such as a switch, or the like, to actively and in real time "listen" to a channel (i.e., a TX pair or an RX pair) and receive the packets destined for another end device.

FIG. 19 is an electrical schematic diagram of an embodiment of the present invention which uses inline power and mostly passive components to allow a network device such as a switch, or the like, to actively and in real time "listen" to a channel (i.e., a TX pair or an RX pair) and receive the packets destined for another end device. The monitoring device may take control (e.g., switch from being slave to being master) if problems are detected in the monitored signal.

FIG. 19 illustrates two pairs of conductors associated with a first network device 40, two pairs of conductors associated with a second network device 42 and two pairs of conductors associated with a third network device 59. A pair of center-tapped magnetics X2 and X3 route inline power to bias the signal diodes for sniffing as follows:

1. Inline power control circuit 120 applies a positive DC signal to pin 4 (center tap) of magnetic XTX-PSEA associated with first network device 40's transmit-side circuitry.

2. Inline power travels over lines TPA and TNA from the secondary winding 132 of XTX-PSEA to nodes 134 and 136.

3. At nodes 134 and 136 the inline power splits, some of it being applied to resistors R32 and R33, the rest being applied to signal diodes DTAP and DTAN (which may be silicon diodes chosen for relatively low capacitance, for example) and from there to the center-tapped secondary 138 of magnetic XRX-PD associated with third network device 59 where power is directed from the center tap at pin 6 to PD circuitry 140.

4. Inline power applied to resistors R32 and R33 (450 ohms) passes through diodes D31 and D32 to a primary center-tapped winding 142 of center-tapped magnetic X2.

5. The center taps of X2 are shorted so the inline power is thus applied to the center tap of secondary winding 144 of X2 and from there via diodes D33 and D34 to lines TNB and TPB, respectively.

6. Lines TNB and TPB are coupled to secondary center-tapped winding 146 of magnetic device XTX-PSEB. Current may also flow through diodes DTBN and DTBP to the secondary 138.

7. Inline power applied to the secondary 146 is directed via center tap pin 4 of XTX-PSEB to inline power control circuit 148 and from there to a center tap of secondary 150 of magnetic device XRX-PSEB.

8. From the secondary 150 the inline power signal flows over lines RPB, RNB to nodes 152 and 154 and is blocked at diodes DRBP, DRBN.

9. From nodes 152, 154 the inline power flows through diodes D37, D38 into the primary 156 of center-tapped magnetic X3 which has its center taps shorted together as in X2.

10. Inline power thus flows across X3 to secondary 158 and via diodes D35, D36 and resistors R34, R35 (450 ohm resistors) to lines RPA, RNA (blocked by diodes DRAP, DRAN) and into secondary center-tapped winding 160 of magnetic XRX-PSEA.

11. From the center tap of secondary 160 the inline power completes the circuit by returning to inline power control circuit 130.

In this manner the signal on the TX side of first network device 40 is routed to the RX side of third network device 59 through diodes DTAP and DTAN but it is also routed through diodes D31/D32 and D33/D34 to the TX side of second network device 42 (which typically includes a receiver circuit as well which can now be used for monitoring the TX of first network device 40). Similarly, the TX side of third network device 59 routes its signals via diodes DRBP/DRBN to the RX side of second network device 42 but also via diodes D37/D38 and D35/D36 via relatively high impedance resistors R34/R35 to the RX side of first network device 40. The high impedance presented by resistors R32, R33, R34 and R35 allows the biasing power to flow without any difficulty and keeps the loading on the monitoring circuit relatively low so that it does not adversely effect the communications over the primary (monitored) link. An amplifier associated with the monitoring PHY may be used to boost the data signal back up to recoverable levels.

While the foregoing system has been described in the context of a port having a pair of TX conductors and a pair of RX conductors, as is used in 10 Base T and 100 Base T Ethernet networking, the approach is equally applicable to networks using larger numbers of conductor pairs, such as 1000 Base T Ethernet which uses all four pairs (eight conductors) and can simply be implemented by doubling up on the circuitry shown.

It should be noted that in accordance with embodiments of the present invention, it is contemplated that the selection device described herein may be configured so that it is disposed nearby an end device such as a PD, or built into such an end device. It may also be disposed at any other location between the end device and the PSE devices. Those of ordinary skill in the art will now recognize that it may be built into the same box containing the two PSEs, into a box containing one of the PSEs, or the like.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. A powered device for selectively biasing on diode switches in a Power over Ethernet (PoE) system, comprising:
    a first terminal arranged to couple to a power source equipment (PSE) through a first pair of diodes;
    a second terminal arranged to couple to the PSE through a second pair of diodes;
    a threshold detection circuit for monitoring an inline power voltage between the first terminal and the second terminal;
    a switch controlled by the threshold detection circuit; and
    a load circuit coupled in series with the switch to receive power applied between the first terminal and the second terminal when the switch is closed;
    the threshold detection circuit arranged to close the switch when the inline power voltage is within a first range of voltage levels and to open the switch when the inline power voltage exceeds said first range of voltage levels.

2. The powered device of claim 1, wherein:
    the first range of voltage levels is less than about 5 volts DC.

3. The powered device of claim 2, wherein:
    the load circuit comprises circuitry for forward-biasing signal diodes.

4. The powered device of claim 2, wherein the load circuit has a resistance of approximately 12,500 ohms.

5. The powered device of claim 4, further comprising a PoE identity network including a 25,000-ohm resistance.

6. The powered device of claim 4, further comprising:
    a first pair of terminals arranged to couple to the PSE;
    a second pair of terminals arranged to couple to a second PSE;
    a first relay coupled across the first pair of terminals and arranged to selectively short circuit the first pair of terminals; and
    a second relay coupled across the second pair of terminals and arranged to selectively short circuit the second pair of terminals.

7. The powered device of claim 6, further comprising:
    first voltage sense circuitry coupled to the first pair of terminals;
    second voltage sense circuitry coupled to the second pair of terminals;
    first control circuitry coupled to a relay coil of the first relay; and
    second control circuitry coupled to a relay coil of the second relay,
    wherein the first control circuitry is operative in response to the second voltage sense circuitry for opening and closing the first relay, and
    wherein the second control circuitry is operative in response to the first voltage sense circuitry for opening and closing the second relay.

8. The powered device of claim 7, further comprising first common mode communication circuitry coupled to the first control circuitry and including a switchable current source coupled to the first terminal and the second terminal for creating a modulated current signal detectable by the PSE.

9. The powered device of claim 8, further comprising second common mode communication circuitry coupled to the second control circuitry and including a switchable current source coupled to the first terminal and the second terminal for creating a modulated current signal detectable by the PSE.

10. A power over Ethernet (PoE) system, comprising:
    a power source equipment (PSE);
    a second device;
    a selector coupled to the second device;
    a first pair of diodes coupled between the PSE and the selector; and
    a second pair of diodes coupled between the PSE and the selector,
    wherein the selector includes a powered device for selectively biasing on the first pair of diodes and the second pair of diodes to selective enable data communication between the first PSE and the second device,
    the powered device including:
        a first terminal arranged to couple to the PSE through the first pair of diodes;
        a second terminal arranged to couple to the PSE through the second pair of diodes;
        a threshold detection circuit for monitoring an inline power voltage between the first terminal and the second terminal;
        a switch controlled by the threshold detection circuit; and
        a load circuit coupled in series with the switch to receive power applied between the first terminal and the second terminal when the switch is closed;
        the threshold detection circuit arranged to close the switch when the inline power voltage is within a first range of voltage levels and to open the switch when the inline power voltage exceeds said first range of voltage levels.

11. The PoE system of claim 10, wherein the first range of voltage levels is less than a voltage level employed by the PSE to perform a discovery operation of powered devices coupled to the PSE.

12. The PoE system of claim 10, wherein the powered device further includes:
    a first pair of terminals arranged to couple to the PSE;
    a second pair of terminals arranged to couple to a second PSE;
    a first relay coupled across the first pair of terminals and arranged to selectively short circuit the first pair of terminals; and
    a second relay coupled across the second pair of terminals and arranged to selectively short circuit the second pair of terminals.

13. The PoE system of claim 12, wherein the powered device further includes:
    first voltage sense circuitry coupled to the first pair of terminals;
    second voltage sense circuitry coupled to the second pair of terminals;
    first control circuitry coupled to a relay coil of the first relay; and second control circuitry coupled to a relay coil of the second relay,
wherein the first control circuitry is operative in response to the second voltage sense circuitry for opening and closing the first relay, and
wherein the second control circuitry is operative in response to the first voltage sense circuitry for opening and closing the second relay.

14. The PoE system of claim 13, wherein the powered device further includes:
first common mode communication circuitry coupled to the first control circuitry and including a switchable current source coupled to the first terminal and the second terminal for creating a modulated current signal detectable by the first PSE and the second PSE.

15. The PoE system of claim 14, wherein the powered device further includes:
second common mode communication circuitry coupled to the second control circuitry and including a switchable current source coupled to the first terminal and the second terminal for creating a modulated current signal detectable by the first PSE and the second PSE.

16. A method of using a powered device in a power over Ethernet (PoE) system, comprising:
monitoring an inline power voltage between a first terminal and a second terminal, the first terminal coupled to a power source equipment (PSE) through a first pair of diodes and a second terminal coupled to the PSE through a second pair of diodes;
receiving the inline power voltage by a switch coupled in series with a load circuit;
closing the switch to allow current to flow through the load circuit when monitoring indicates that the inline power voltage is within a first range of voltage levels; and
opening the switch to prevent current from flowing through the load circuit when the inline power voltage exceeds said first range of voltage levels.

17. The method of claim 16, wherein closing the switch causes a current to flow across each of the first pair of diodes, and wherein the method further comprises:
transmitting data electronically from the first PSE to a third device through the first pair of diodes.

18. The method of claim 17, wherein opening the switch causes substantially no current to flow across each of the first pair of diodes, and wherein the method further comprises:
blocking data from being transmitted electronically from the first PSE to the third device through the first pair of diodes.

19. The method of claim 18, further comprising modulating a current drawn from the first PSE to communicate with the first PSE.

20. The method of claim 18, further comprising short circuiting an input coupled to the first PSE to direct the first PSE to shut itself down.

* * * * *